(12) United States Patent
Wataishi

(10) Patent No.: US 8,839,250 B2
(45) Date of Patent: Sep. 16, 2014

(54) IMAGE FORMING APPARATUS, STORAGE MEDIUM, AND PROGRAM SYSTEM DETERMINATION

(75) Inventor: Saki Wataishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 380 days.

(21) Appl. No.: 13/207,007

(22) Filed: Aug. 10, 2011

(65) Prior Publication Data

US 2012/0054758 A1 Mar. 1, 2012

(30) Foreign Application Priority Data

Aug. 25, 2010 (JP) .................................. 2010-188576

(51) Int. Cl.
| | |
|---|---|
| G06F 9/46 | (2006.01) |
| H04N 1/00 | (2006.01) |
| H04N 1/23 | (2006.01) |
| H04N 1/32 | (2006.01) |
| G06Q 10/06 | (2012.01) |

(52) U.S. Cl.
CPC ....... *H04N 1/32561* (2013.01); *H04N 1/00408* (2013.01); *H04N 1/2392* (2013.01); *H04N 1/00477* (2013.01); *H04N 2201/0039* (2013.01); *H04N 1/00954* (2013.01); *H04N 1/00493* (2013.01); *H04N 1/00824* (2013.01); *H04N 1/00244* (2013.01); *H04N 1/00973* (2013.01); *G06Q 10/06* (2013.01)
USPC .......................................... 718/100; 718/102

(58) Field of Classification Search
None
See application file for complete search history.

(56) References Cited

U.S. PATENT DOCUMENTS

| | | | |
|---|---|---|---|
| 5,999,911 A | 12/1999 | Berg et al. | |
| 6,715,070 B1 | 3/2004 | Peloquin et al. | |
| 7,533,381 B2 | 5/2009 | Ando | |
| 7,542,158 B2 * | 6/2009 | Ogura | 358/1.15 |
| 7,551,885 B2 * | 6/2009 | Yaguchi | 399/368 |
| 7,812,978 B2 * | 10/2010 | Ando et al. | 358/1.13 |
| 7,855,797 B2 * | 12/2010 | Okada | 358/1.15 |
| 7,865,890 B2 | 1/2011 | Sumi et al. | |
| 7,899,341 B2 * | 3/2011 | Moro | 399/15 |
| 8,127,031 B2 * | 2/2012 | Oya | 709/229 |
| 2007/0044085 A1 | 2/2007 | Stamper et al. | |
| 2007/0220510 A1 | 9/2007 | Bell et al. | |
| 2008/0155454 A1 | 6/2008 | Balasubramanian | |
| 2008/0183754 A1 | 7/2008 | Kitada | |
| 2008/0209569 A1 | 8/2008 | Araki | |
| 2010/0037224 A1 * | 2/2010 | Hosoda | 718/100 |
| 2010/0138835 A1 | 6/2010 | Yagi | |
| 2010/0162107 A1 | 6/2010 | Nakajima et al. | |

FOREIGN PATENT DOCUMENTS

| | | |
|---|---|---|
| JP | 2004-312711 | 11/2004 |
| JP | 2005-032128 | 2/2005 |
| JP | 2005-115920 | 4/2005 |

OTHER PUBLICATIONS

Extended European Search Report dated Apr. 25, 2012.
Japanese Office Action dated Apr. 8, 2014.

* cited by examiner

*Primary Examiner* — Van Nguyen
(74) *Attorney, Agent, or Firm* — IPUSA, PLLC

(57) ABSTRACT

An image forming apparatus includes a memory configured to store programs installed in the image forming apparatus and having plural states; a condition storing unit configured to store at least one condition defining a set of states of one or more of the programs; a state obtaining unit configured to obtain state information indicating current states of the programs; and a condition examination unit configured to examine the condition based on the obtained state information to determine whether the condition is satisfied and to output a result of the determination.

15 Claims, 20 Drawing Sheets

FIG.6

| | | | |
|---|---|---|---|
| INSTALLED | STARTED | ACTIVE | SDK APPLICATION HAS BEEN STARTED AND IS ABLE TO NORMALLY PERFORM PROCESS | a |
| | | CONFIGURATION -REQUIRED | SDK APPLICATION HAS BEEN STARTED, BUT IS UNABLE TO NORMALLY PERFORM PROCESS BECAUSE SETTINGS HAVE NOT BEEN SPECIFIED (SOME SDK APPLICATIONS MAY NOT HAVE THIS STATE) | b |
| | | RESTART -REQUIRED | SDK APPLICATION HAS BEEN STARTED, BUT RESTART OF IMAGE FORMING APPARATUS IS NECESSARY (SOME SDK APPLICATIONS MAY NOT HAVE THIS STATE) | c |
| | | ERROR | SDK APPLICATION THAT HAS BEEN STARTED IS NOT ABLE TO PERFORM PROCESS NORMALLY DUE TO ERROR | d |
| | STOPPED | STANDBY | SDK APPLICATION HAS BEEN INSTALLED BUT IS INACTIVE | e |
| | | CONFIGURATION -REQUIRED | SDK APPLICATION IS INACTIVE AND SETTINGS HAVE NOT BEEN SPECIFIED (SOME SDK APPLICATIONS MAY NOT HAVE THIS STATE) | f |
| | | RESTART -REQUIRED | SDK APPLICATION IS INACTIVE AND RESTART OF IMAGE FORMING APPARATUS IS NECESSARY (SOME SDK APPLICATIONS MAY NOT HAVE THIS STATE) | g |
| | | ERROR | SDK APPLICATION IS INACTIVE AND ERROR HAS OCCURRED | h |
| NON-INSTALLED | | | SDK APPLICATION HAS NOT BEEN INSTALLED | i |

FIG.9

| SET CONDITION NAME | CHECK FLAG | PRODUCT ID | STATE | PRODUCT ID | STATE | PRODUCT ID | STATE | PRODUCT ID | STATE |
|---|---|---|---|---|---|---|---|---|---|
| SET CONDITION A | on | AAA | a | BBB | a | CCC | a | DDD | a |
| SET CONDITION B | on | AAA | a | EEE | a | | | | |

| SET CONDITION NAME | CHECK FLAG | PRODUCT ID | STATE | PRODUCT ID | STATE | PRODUCT ID | STATE | PRODUCT ID | STATE |
|---|---|---|---|---|---|---|---|---|---|
| SET CONDITION A | off | AAA | a | BBB | a | CCC | a | DDD | a |
| SET CONDITION B | off | AAA | a | EEE | a | | | | |

| AAA | BBB | CCC | DDD | EEE |
|-----|-----|-----|-----|-----|

FIG.12

| AAA | STARTED |
|-----|---------|
| BBB | STOPPED |
| CCC | STARTED |
| EEE | STARTED |

FIG.13

| AAA | a |
|-----|---|
| BBB | e |
| CCC | b |
| DDD | i |
| EEE | a |

FIG.15

| SET CONDITION NAME | CHECK FLAG | PRODUCT ID | STATE | PRODUCT ID | STATE | PRODUCT ID | STATE | PRODUCT ID | STATE | PRODUCT ID |
|---|---|---|---|---|---|---|---|---|---|---|
| SET CONDITION C | on | AAA | a | BBB | a | CCC | a | DDD | i | |

| SET CONDITION NAME | CHECK FLAG | PRODUCT ID | STATE | PRODUCT ID | STATE | PRODUCT ID | STATE | PRODUCT ID | STATE | PRODUCT ID |
|---|---|---|---|---|---|---|---|---|---|---|
| SET CONDITION D | on | AAA | a | BBB | a | CCC | a | DDD | i | |
| SET CONDITION E | on | AAA | a | EEE | e | | | | | |

| MODEL NAME | SET CONDITION NAME | CHECK FLAG | PRODUCT ID | STATE | PRODUCT ID | STATE | PRODUCT ID | STATE | PRODUCT ID | STATE |
|---|---|---|---|---|---|---|---|---|---|---|
| RRR5000 | SET CONDITION F | on | AAA | a | BBB | a | CCC | a | DDD | a |
| RRR3300 | SET CONDITION G | on | AAA | a | EEE | a | | | | |
| RRR5000 | SET CONDITION H | on | AAA | a | CCC | b | | | | |

| APPARATUS ID | PRODUCT ID | PRODUCT ID | PRODUCT ID | PRODUCT ID |
|---|---|---|---|---|
| 3B50-510639 | AAA | BBB | CCC | DDD |
| 3B51-610294 | AAA | DDD | EEE | |
| 3B51-614391 | AAA | CCC | | |

IMAGE FORMING APPARATUS, STORAGE MEDIUM, AND PROGRAM SYSTEM DETERMINATION

CROSS-REFERENCE TO RELATED APPLICATION

The present application is based upon and claims the benefit of priority of Japanese Patent Application No. 2010-188576, filed on Aug. 25, 2010, the entire contents of which are incorporated herein by reference.

BACKGROUND OF THE INVENTION

1. Field of the Invention

A certain aspect of this disclosure relates to an image forming apparatus, a storage medium, and a program state determination system.

2. Description of the Related Art

A known image forming apparatus is configured such that applications programs or "plug-ins" (hereafter, simply called "applications") can be additionally installed after the shipment (see, for example, Japanese Laid-Open Patent Publication No. 2004-312711). The states of the applications may change independent of each other. For example, it is possible to start and stop the applications independently. A started application changes into a started state that can be further classified into various states. Similarly, a stopped application changes into a stopped state that can be further classified into various states.

Accordingly, when multiple applications are installed in an image forming apparatus, the number of combinations of the states of the applications may become huge.

Meanwhile, in such an image forming apparatus, a service (or function) may be implemented by collaboration of multiple applications. To be able to provide such a service, all applications implementing the service need to be installed and started in the image forming apparatus.

However, since the states of applications can change independently as described above, it may happen that one of applications implementing a service has been started, but another one of the applications has not been started. For this reason, an administrator (user, serviceperson, or so on) needs to check the states of all applications implementing a service to determine whether the service is in normal operation. This in turn makes it necessary for the administrator to know the applications implementing the service.

Moreover, in an environment where multiple image forming apparatuses are managed via a network, the administrator needs to check the states of applications for each of the image forming apparatuses.

Accordingly, the workload of an administrator increases as the number of applications and the number of image forming apparatuses to be managed increase.

SUMMARY OF THE INVENTION

In an aspect of this disclosure, there is provided an image forming apparatus including a memory configured to store programs installed in the image forming apparatus and having plural states; a condition storing unit configured to store at least one condition defining a set of states of one or more of the programs; a state obtaining unit configured to obtain state information indicating current states of the programs; and a condition examination unit configured to examine the condition based on the obtained state information to determine whether the condition is satisfied and to output the result of the determination.

BRIEF DESCRIPTION OF THE DRAWINGS

FIG. 6 is a table illustrating exemplary states of SDK applications;

FIG. 9 is a table illustrating an exemplary configuration of set conditions stored in a set condition storing unit according to the first embodiment;

FIG. 10 is a table illustrating exemplary set conditions whose check flags are turned off;

FIG. 11 is a table illustrating an exemplary inquiry list;

FIG. 12 is a table illustrating an exemplary installed application list;

FIG. 13 is a table illustrating an exemplary inquiry result list;

FIG. 15 is a table showing an exemplary set condition used to confirm that incompatible SDK applications do not coexist;

FIG. 16 is a table illustrating set conditions that are mutually exclusive;

FIG. 20 is a table illustrating an exemplary configuration of set conditions stored in a central set condition storing unit according to the third embodiment;

FIG. 23 is a table illustrating an exemplary configuration of information stored in an apparatus information storing unit.

DESCRIPTION OF THE PREFERRED EMBODIMENTS

Figure 1:
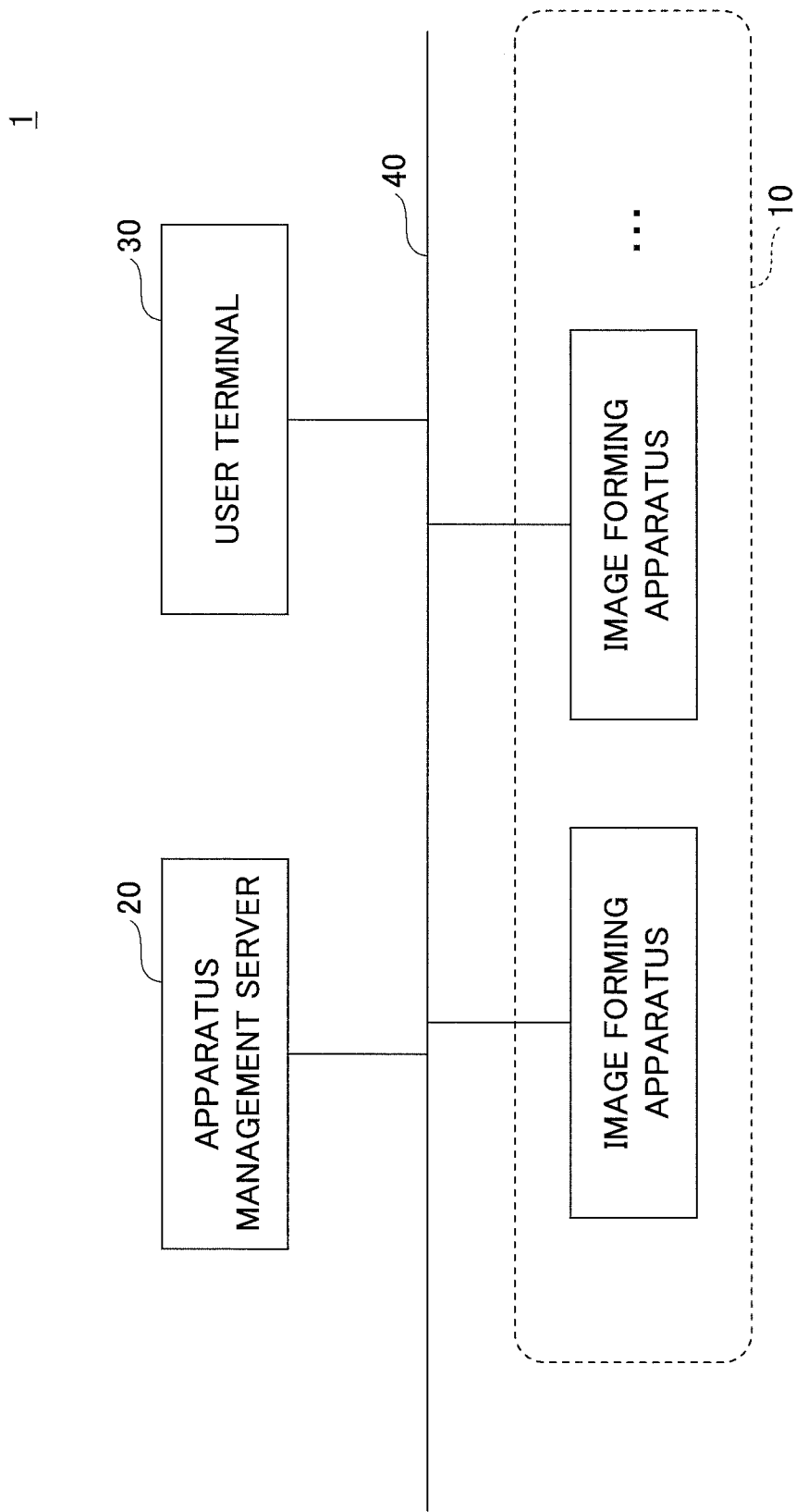
FIG. 1 is a drawing illustrating an exemplary configuration of an apparatus management system according to a first embodiment.

Preferred embodiments of the present invention are described below with reference to the accompanying drawings. FIG. 1 is a drawing illustrating an exemplary configuration of an apparatus management system 1 according to a first embodiment. As illustrated in FIG. 1, the apparatus management system 1 includes one or more image forming apparatuses 10 (for descriptive purposes, the image forming apparatuses 10 may be called the image forming apparatus 10 in the singular form), an apparatus management server 20, and a user terminal 30 that are connected via a (wired or wireless) network 40 such as a local area network (LAN).

The image forming apparatus 10 may be, for example, a multifunction peripheral including multiple functions such as printing, scanning, copying, and facsimile transmission and reception. Alternatively, the image forming apparatus 10 may be an apparatus providing any one of the functions. The image forming apparatus 10 may be configured such that applications (e.g., SDK applications 152 described later) can be installed and uninstalled to add and remove functions.

The apparatus management server 20 may be implemented, for example, by a computer and configured to remotely manage and/or operate the image forming apparatuses 10 according to requests sent from the user terminal 30. For example, the apparatus management server 20 monitors the states of the image forming apparatuses 10 and the states of programs installed in the image forming apparatuses 10.

The user terminal 30 may be implemented by a computer including an input unit such as a mouse and a keyboard and a display unit such as a liquid-crystal display, and configured to function as a user interface for the apparatus management system 1. For example, the user terminal 30 allows the user to input a request to be sent to the apparatus management server 20 and displays information sent from the apparatus management server 20 in response to the request.

Figure 2:
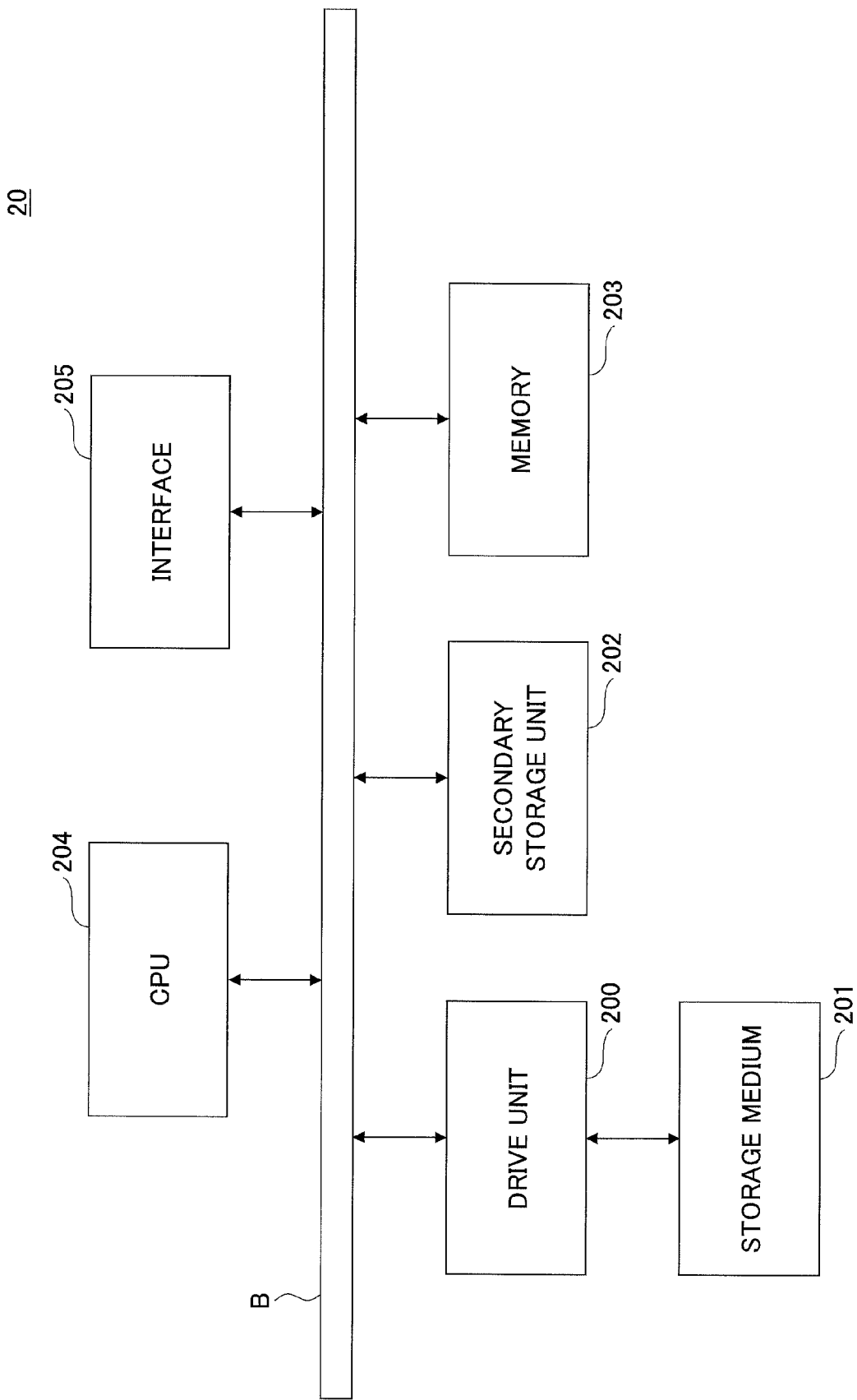
FIG. 2 is a block diagram illustrating an exemplary hardware configuration of an apparatus management server.

FIG. 2 is a block diagram illustrating an exemplary hardware configuration of the apparatus management server 20. As illustrated in FIG. 2, the apparatus management server 20 may include a drive unit 200, a secondary storage unit 202, a memory 203, a CPU 204, and an interface 205 that are connected to each other via a bus B.

Programs for implementing various processes at the apparatus management server 20 may be provided by a storage medium 201 such as a CD-ROM, a DVD-ROM, or a USB memory. When the storage medium 201 storing programs is mounted on the drive unit 200, the programs are read by the drive unit 200 from the storage medium 201 and are installed in the secondary storage unit 202. The programs may not necessarily be installed from the storage medium 201, but may instead be downloaded via a network from another computer. The secondary storage unit 202 stores the installed programs and other necessary files and data.

The memory 203 temporarily stores programs retrieved from the secondary storage unit 202 when the programs are executed. The CPU 204 performs functions of the apparatus management server 20 according to the programs temporarily stored in the memory 203. The interface 205 connects the apparatus management server 20 to a network.

The apparatus management server 20 may be configured to be operated directly by the user. In this case, the apparatus management server 20 may further include an input unit and a display unit.

Figure 3:
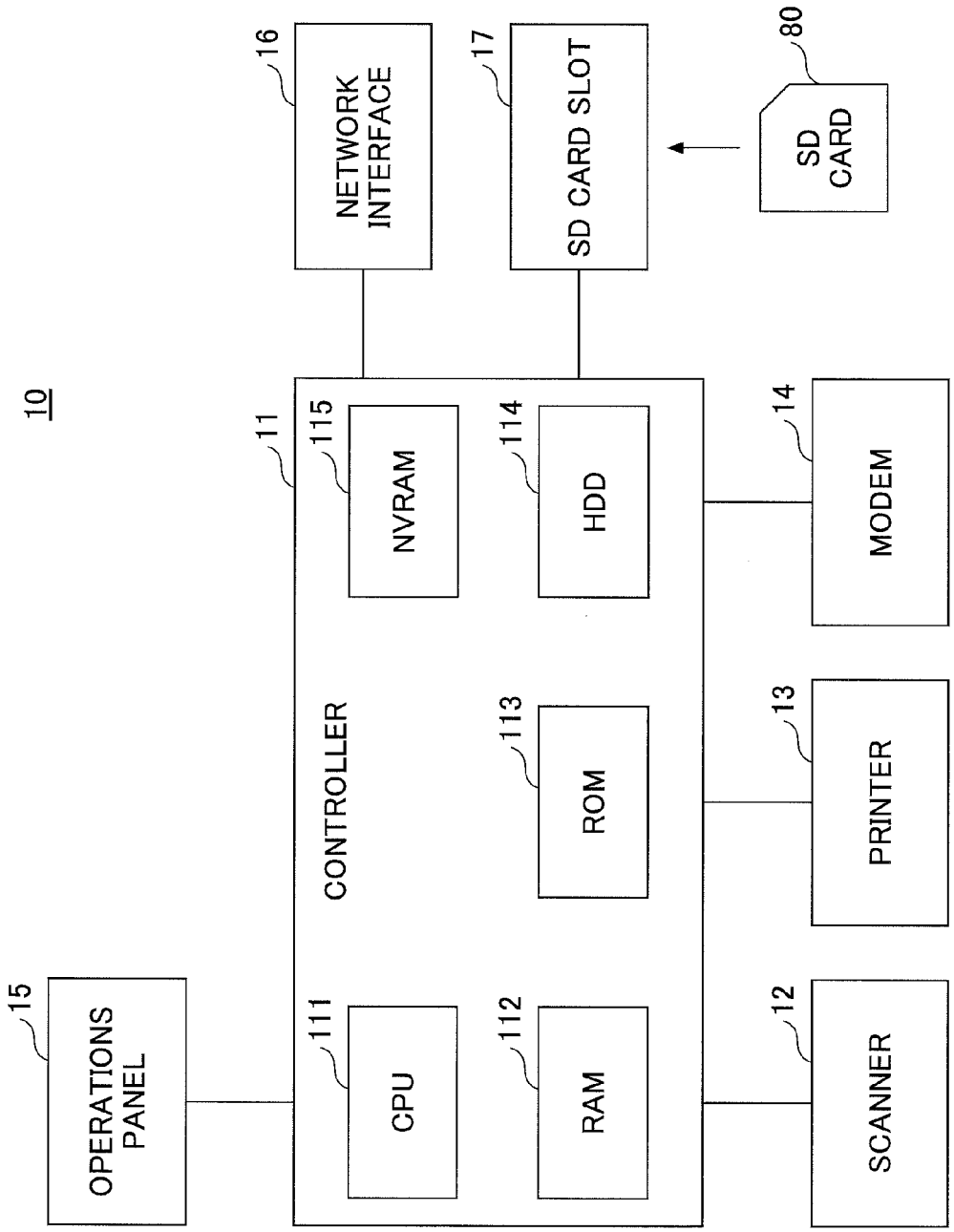
FIG. 3 is a block diagram illustrating an exemplary hardware configuration of an image forming apparatus.

FIG. 3 is a block diagram illustrating an exemplary hardware configuration of the image forming apparatus 10. As illustrated in FIG. 3, the image forming apparatus 10 may include, as hardware components, a controller 11, a scanner 12, a printer 13, a modem 14, an operations panel 15, a network interface 16, and an SD (secure digital) card slot 17.

The controller 11 may include a CPU 111, a RAM 112, a ROM 113, an HDD 114, and a non-volatile RAM (NVRAM) 115. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs. The NVRAM 115 stores, for example, various settings.

The scanner 12 is hardware (image scanning unit) for scanning a document to obtain image data. The printer 13 is hardware (printing unit) for printing print data on a recording medium such as paper. The modem 14 is hardware for connecting the image forming apparatus 10 to a telephone line and is used to send and receive image data for facsimile communications. The operations panel 15 is hardware including an input unit such as buttons for receiving user inputs and a display unit such as a liquid crystal display panel. The network interface 16 is hardware for connecting the image forming apparatus 10 to a (wired or wireless) network such as a LAN. The SD card slot 17 reads, for example, programs stored in an SD card 80. Thus, with the image forming apparatus 10 of this embodiment, in addition to the programs stored in the ROM 113, programs stored in the SD card 80 can be loaded into the RAM 112 and executed.

Figure 4:
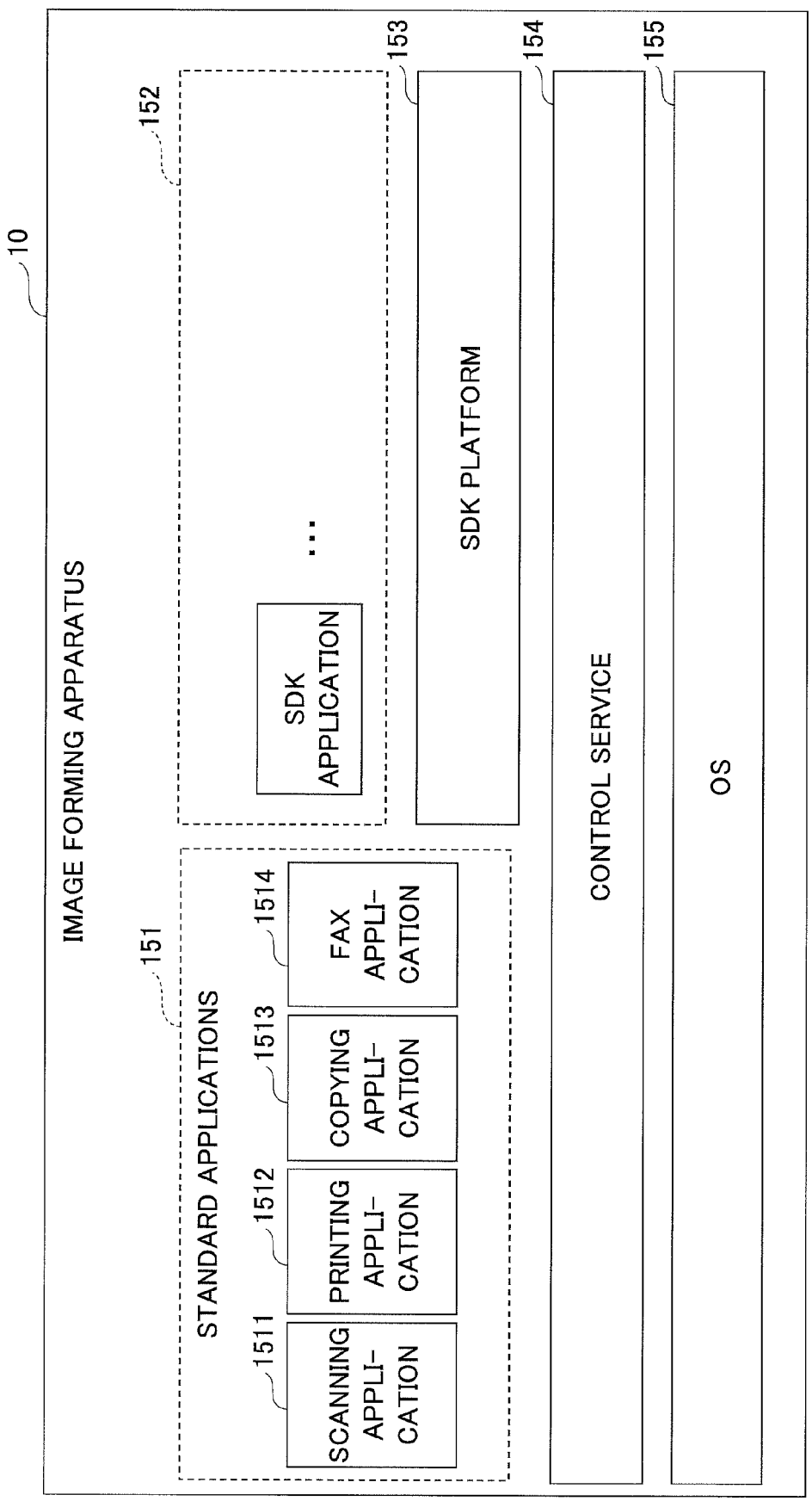
FIG. 4 is a drawing illustrating an exemplary software configuration of an image forming apparatus.

FIG. 4 is a drawing illustrating an exemplary software configuration of the image forming apparatus 10. As illustrated in FIG. 4, the image forming apparatus 10 may include standard applications 151, SDK applications 152, an SDK platform 153, a control service 154, and an OS 155.

The standard applications 151 are default applications installed in the image forming apparatus 10 before the factory shipment. In the example of FIG. 4, the standard applications 121 include a scanning application 1511, a printing application 1512, a copying application 1513, and a fax application 1514. The scanning application 1511 performs a scan job. The printing application 1512 performs a print job. The copying application 1513 performs a copy job. The fax application 1514 performs a facsimile transmission job and a facsimile reception job.

The control service 154 is implemented by software modules that, for example, provide functions for controlling various hardware resources for upper-layer applications and perform fundamental functions of the image forming apparatus 10.

The SDK applications 152 (may be used in the singular form for descriptive purposes) are plug-in applications that are additionally installed to expand the functions of the image forming apparatus 10 after its factory shipment. Applications that provide any appropriate functions may be used as the SDK applications 152. The SDK applications 152 may be installed, for example, via the SD card 80 or a network into a storage unit or a memory (e.g., an HDD 114 or an NVRAM 115 described later) of the image forming apparatus 10.

The SDK platform 153 provides an execution environment for the SDK applications 152. The SDK applications 152 are developed using application programming interfaces (API) provided by the SDK platform 153. For example, the SDK platform 153 provides the SDK applications 152 with a scanning function interface, a print function interface, and a copy function interface. APIs provided by the SDK platform 153 may be made public to allow a third party to develop the SDK applications 152. Since the APIs are machine-independent, it is generally not necessary to modify the SDK applications 152 for different types (or models) of image forming apparatuses.

The OS 155 is an operating system. Software programs in the image forming apparatus 10 run as processes or threads on the OS 155.

Figure 5:
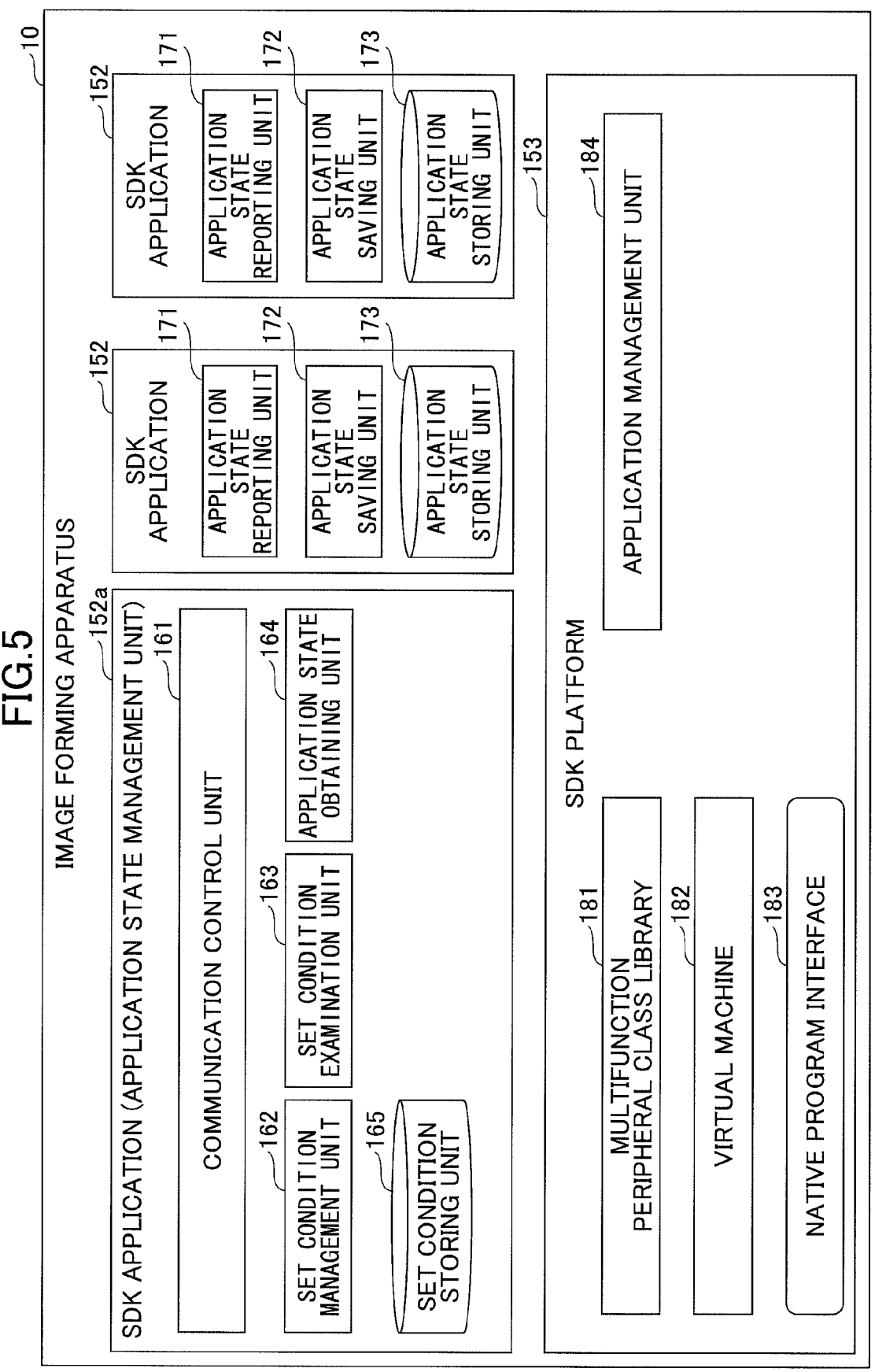
FIG. 5 is a drawing illustrating exemplary functional configurations of SDK applications and an SDK platform.

The SDK applications 152 and the SDK platform 153 are described below in more detail. FIG. 5 is a drawing illustrating exemplary functional configurations of the SDK applications 152 and the SDK platform 153.

In the example of FIG. 5, the image forming apparatus 10 includes an SDK application 152a and other SDK applications 152. In this embodiment, the SDK application 152a functions as an application state management unit. Hereafter, the SDK application 152a is called the application state management unit 152a to distinguish it from other SDK applications 152.

The application state management unit 152a manages the states of the other SDK applications 152. The application state management unit 152a may include a communication control unit 161, a set condition management unit 162, a set condition examination unit 163, an application state obtaining unit 164, and a set condition storing unit 165.

The set condition storing unit 165 is implemented, for example, by a part of the NVRAM 115 and stores one or more set conditions. In this embodiment, a "set condition" defines a set of conditions or parameters indicating the states of one or more SDK applications 152. A combination of SDK applications 152 specified in a set condition is called an "application set". A combination of SDK applications 152 constituting an application set may be determined based on functional dependence or distribution-related relationships among the SDK applications 152. Functional dependence indicates, for example, a relationship where an SDK application 152 (application A) uses the function of another SDK application 152 (application B). A distribution-related relationship indicates, for example, a relationship where the application A and the application B are sold or marketed as a packaged product. In many cases, SDK applications 152 having a distribution-related relationship also have functional dependence. However, SDK applications 152 having a distribution-related relationship may not have functional dependence.

The set condition management unit 162 records or registers set conditions in the set condition storing unit 165, retrieves the set conditions from the set condition storing unit 165, and processes the set conditions.

The application state obtaining unit 164 obtains state information indicating the state of each SDK application 152 from the corresponding SDK application 152. In this embodiment, each SDK application 152 has various states and changes (or transitions) from one state to another in response to the occurrence of an event.

The set condition examination unit 163 determines whether the set conditions stored in the set condition storing unit 165 are satisfied (or met) based on the state information obtained by the application state obtaining unit 164.

The communication control unit 161, for example, receives a request to examine set conditions (to determine whether the set conditions are satisfied) from the apparatus management server 20 and sends the result of examination by the set condition examination unit 163 to the apparatus management server 20.

Each of the SDK applications 152 other than the application state management unit 152a may include an application state reporting unit 171, an application state saving unit 172, and an application state storing unit 173.

The application state reporting unit 171 retains the current state of the corresponding SDK application 152 using, for example, the RAM 112. In other words, the application state reporting unit 171 stores and keeps state information indicating the current state of the corresponding SDK application 152 in the RAM 112. Also, the application state reporting unit 171 sends the state information stored in the RAM 112 in response to a request for the state information from the application state obtaining unit 164.

The application state saving unit 172 obtains the state information from the application state reporting unit 171 when the SDK application 152 changes to the stopped state, and writes (or saves) the obtained state information in the application state storing unit 173.

The application state storing unit 173 stores the state information using, for example, the NVRAM 115. More specifically, the state information of the SDK application 152 is stored in a storage area in the NVRAM 115 which is associated with the SDK application 152.

The SDK platform 153 may include a multifunction peripheral class library 181, a virtual machine 182, a native program interface 183, and an application management unit 184.

The multifunction peripheral class library 181 is a Java (registered trademark) class library that provides APIs. Requests submitted via the APIs may be transferred to the control service 154 as necessary. The results of processing performed by the control service 154 are returned to the multifunction peripheral class library 181. Then, the multifunction peripheral class library 181 converts the processing results into formats corresponding to the APIs and returns the converted processing results to the SDK applications 152.

The native program interface 183, for example, enables the multifunction peripheral class library 181 to transfer requests to the control service 154 using the Java Native Interface (JNI). That is, the native program interface 183 is necessary for communications between the multifunction peripheral class library 181 and the control service 154 that is written in native code.

The virtual machine 182 is a Java virtual machine that interprets and executes Java bytecode instructions. The SDK applications 152 are executed as threads by the virtual machine 182.

The application management unit 184, for example, manages life cycles of the SDK applications 152. For example, the application management unit 184 displays a management screen for allowing the user to operate the SDK applications 152. In response to user inputs on the management screen, the application management unit 184 installs, starts, stops, and uninstalls the SDK applications 152. The application management unit 184 also manages application list information containing a list of the SDK applications 152 installed in the image forming apparatus 10. The application list information may be stored, for example, in the NVRAM 115.

Here, the SDK platform 153 itself is also a type of application installed in the image forming apparatus 10. The SDK platform 153 may be installed, for example, via the SD card 80 or a network into the image forming apparatus 10. Unlike the SDK applications 152, the SDK platform 153 runs as a process on the control service 154.

Next, states of the SDK applications 152 are described. FIG. 6 is a table illustrating exemplary states of the SDK applications 152. In FIG. 6, "a" through "i" in the rightmost column are signs assigned to the respective states.

The states of an SDK application 152 may be roughly classified into a non-installed state "i" and an installed state. The non-installed state "i" indicates that the SDK application 152 has not been installed in the image forming apparatus 10. The installed state indicates that the SDK application 152 has been installed in the image forming apparatus 10.

The installed state may be classified into a started state and a stopped state. The started state indicates that the SDK application 152 has been loaded into the RAM 112 and started (e.g., the SDK application 152 is running as a thread). The stopped state indicates that the SDK application 152 is inactive.

The started state may be further classified into an active state "a", a configuration-required state "b", a restart-required state "c", and an error state "d". The active state "a" indicates that the SDK application 152 has been started and is able to normally perform a process. The configuration-required state "b" indicates that the SDK application 152 has been started, but is unable to normally perform a process because settings necessary for its operation have not been specified (e.g., immediately after the installation). The restart-required state "c" indicates that the SDK application 152 has been started, but the restart of the image forming apparatus 10 is necessary. For example, after settings of the SDK application 152 are changed, in some cases, it is necessary to restart the image forming apparatus 10 to reflect the changes to the operation of the SDK application 152. The error state "d" indicates that the SDK application 152 that has been started is not able to perform a process normally due to an error. Some SDK applications 152 may not have the configuration-required state "b" and/or the restart-required state "c".

The stopped state may be further classified into a standby state "e", a configuration-required state "f", a restart-required state "g", and an error state "h". The standby state "e" indicates that the SDK application 152 has been installed but is inactive. The configuration-required state "f" indicates that the SDK application 152 is inactive and settings necessary for its operation have not been specified. The restart-required state "g" indicates that the SDK application 152 is inactive and the restart of the image forming apparatus 10 is necessary. The error state "h" indicates that the SDK application 152 is inactive and an error has occurred. Some SDK applications 152 may not have the configuration-required state "f" and/or the restart-required state "g".

Figure 7:
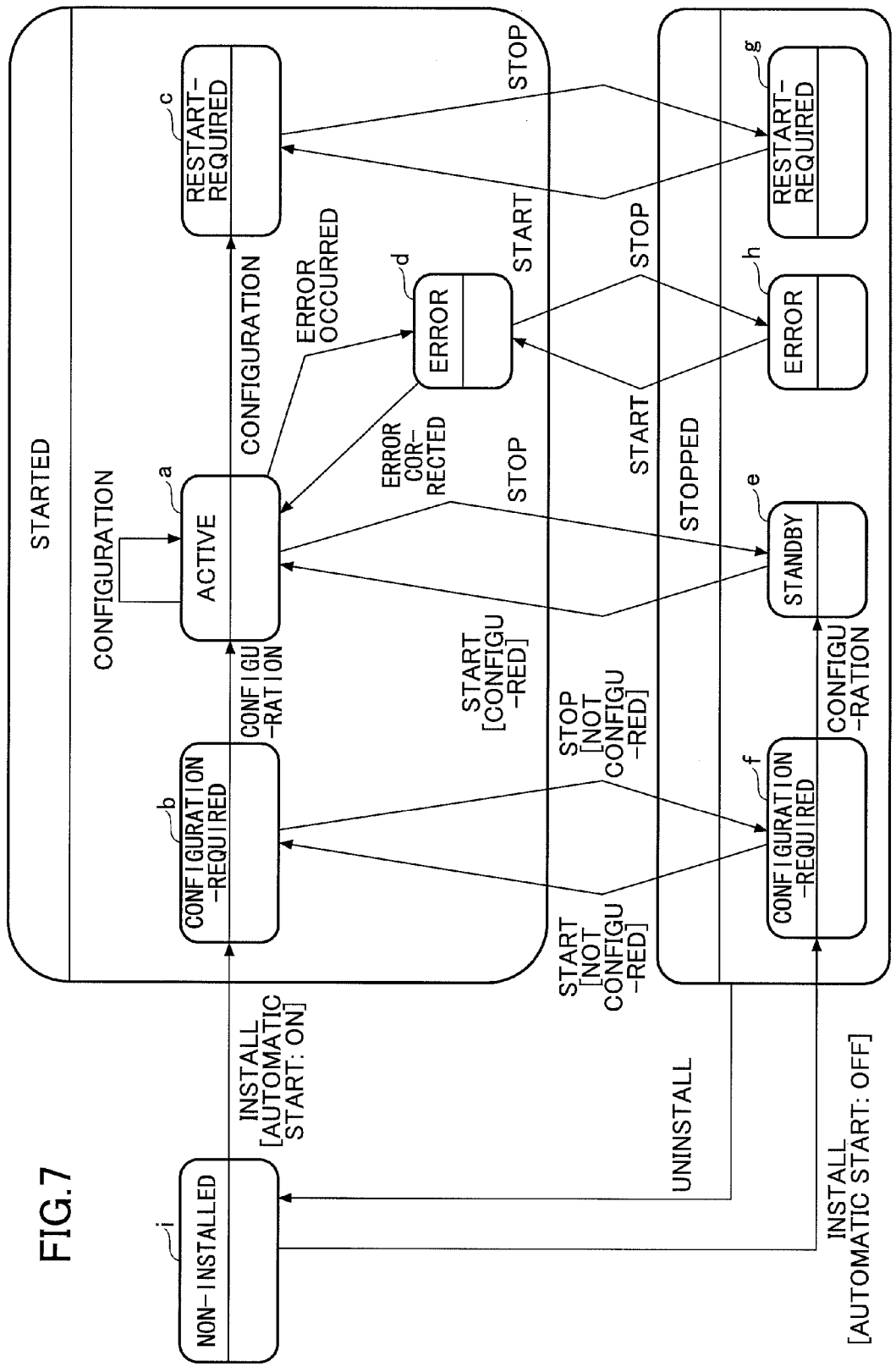
FIG. 7 is a drawing illustrating exemplary state transition of an SDK application.

The states of the SDK application 152 change, for example, as illustrated in FIG. 7. FIG. 7 is a drawing illustrating exemplary state transition of the SDK application 152.

When an SDK application 152 in the non-installed state "i" is installed with an automatic start parameter set to ON, the SDK application 152 changes to the configuration-required state "b". The automatic start parameter is used to specify whether the SDK application 152 is automatically started (ON) or not (OFF) after the installation.

When the SDK application 152 in the configuration-required state "b" is stopped, the SDK application 152 changes to the configuration-required state "f". Then, the application state saving unit 172 of the SDK application 152 stores state information indicating the configuration-required state "f" in the application state storing unit 173. When the SDK application 152 in the configuration-required state "f" is started, the SDK application 152 changes to the configuration-required state "b". Then, the application state reporting unit 171 of the SDK application 152 determines that the SDK application 152 is to change to the configuration-required state "b" based on the state information indicating the configuration-required state f stored in the application state storing unit 173 and stores state information indicating the configuration-required state in the RAM 112. When necessary settings are specified in the configuration-required state "b", the SDK application 152 changes to the active state "a".

When the SDK application 152 in the active state "a" is stopped, the SDK application 152 changes to the standby state "e". Then, the application state saving unit 172 of the SDK application 152 stores state information indicating the standby state in the application state storing unit 173. When the SDK application 152 in the standby state "e" is started, the SDK application 152 changes to the active state "a".

When an error occurs in the active state "a", the SDK application 152 changes to the error state "d". When the SDK application 152 in the error state "d" is stopped, the SDK application 152 changes to the error state "h". Then, the application state saving unit 172 of the SDK application 152 stores state information indicating the error state "h" in the application state storing unit 173. When the SDK application 152 in the error state "h" is started, the SDK application 152 changes to the error state "d". When the SDK application 152 in the error state "d" recovers from the error (or the error is corrected), the SDK application 152 changes to the active state "a".

When the settings are changed in the active state "a", the SDK application 152 changes to the restart-required state "c". When the SDK application 152 in the restart-required state "c" is stopped, the SDK application 152 changes to the restart-required state "g". Then, the application state saving unit 172 of the SDK application 152 stores state information indicating the restart-required state "g" in the application state storing unit 173. When the SDK application 152 in the restart-required state "g" is started, the SDK application 152 changes to the restart-required state "c".

Meanwhile, when an SDK application 152 in the non-installed state "i" is installed with the automatic start parameter set to OFF, the SDK application 152 changes to the configuration-required state "f". When necessary settings are specified in the configuration-required state "f", the SDK application 152 changes to the standby state "e".

The states and state transition rules of the SDK application 152 (how the SDK application 152 changes states) described above are just examples and the SDK application 152 may have states and state transition rules other than those illustrated in FIGS. 6 and 7.

Figure 8:
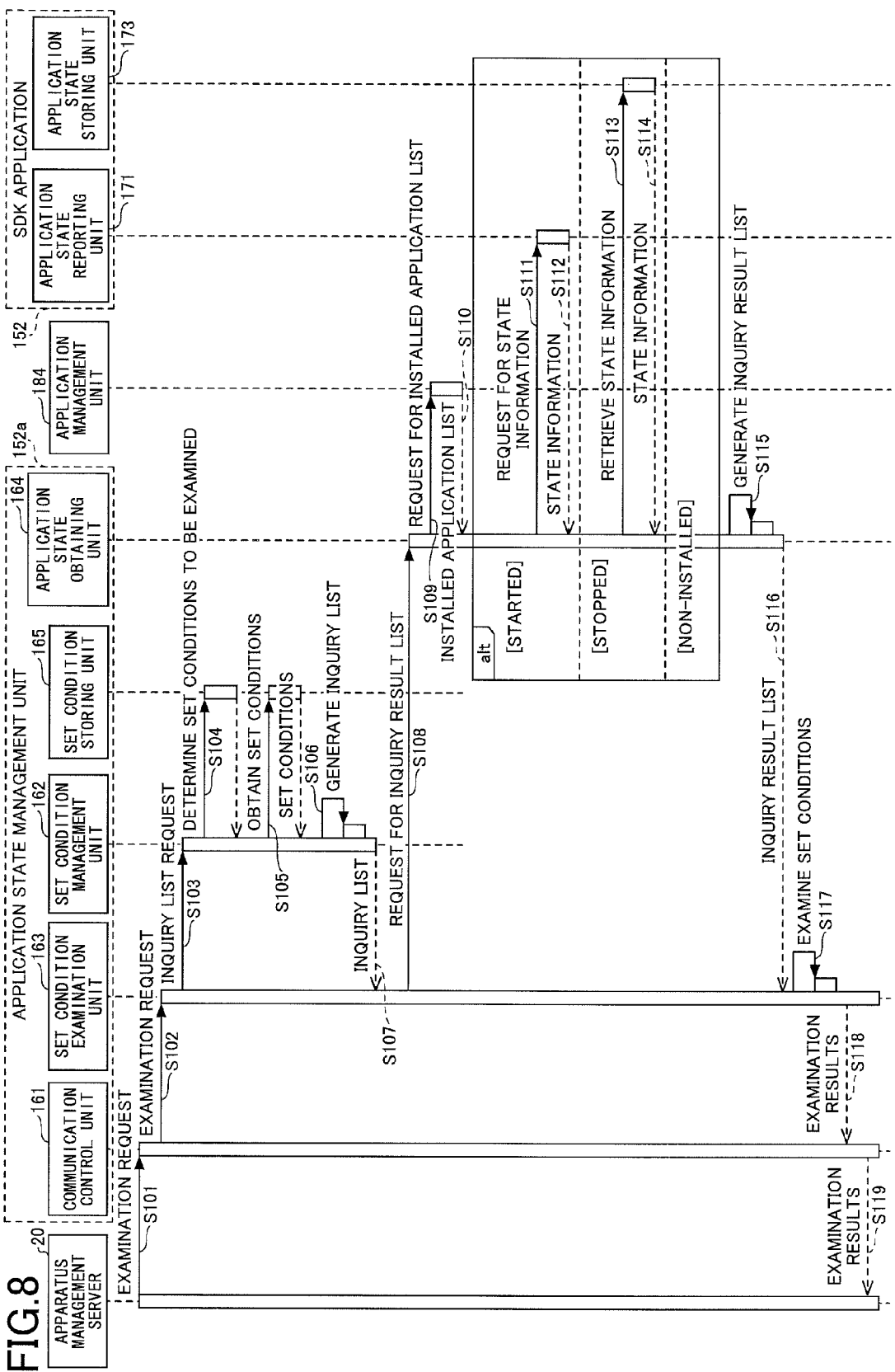
FIG. 8 is a sequence chart illustrating an exemplary process of examining set conditions according to the first embodiment.

An exemplary process performed by the image forming apparatus 10 is described below. FIG. 8 is a sequence chart illustrating an exemplary process of examining set conditions according to the first embodiment.

In step S101, in response to a request received from the user terminal 30, the apparatus management server 20 sends an examination request to request the image forming apparatus 10 to examine set conditions (to determine whether the set conditions are satisfied). The examination request may be sent to one or more image forming apparatuses 10 whose identification information (e.g., IP addresses) is registered in advance in the apparatus management server 20 or to one or more image forming apparatuses 10 that are specified in the request from the user terminal 30.

When receiving the examination request, the communication control unit 161 of the image forming apparatus 10 inputs the examination request to the set condition examination unit 163 (S102). In response to the examination request, the set condition examination unit 163 requests the set condition management unit 162 to send an inquiry list (S103). The inquiry list contains a list of the SDK applications 152 whose states are to be inquired about (or are necessary) to determine whether set conditions are satisfied. Then, the set condition management unit 162 refers to the set condition storing unit 165 and determines whether there are set conditions that need to be examined (S104).

FIG. 9 is a table illustrating an exemplary configuration of set conditions stored in the set condition storing unit 165 according to the first embodiment. As illustrated in FIG. 9, each set condition may include a set condition name, a check flag, and at least one set of a product ID and state information.

The set condition name is an identifier of the corresponding set condition. The check flag indicates whether it is necessary to examine the set condition. When "on" is specified for the check flag, the set condition needs to be examined; and when "off" is specified for the check flag, it is not necessary to examine the set condition.

The product ID is an identifier of an SDK application 152 included in the set condition. The state information indicates a state of the SDK application 152 corresponding to the product ID. When the actual state(s) of the SDK application(s) 152 matches the state information, the set condition is satisfied. One set condition may include two or more combinations of product IDs and state information. In this case, the set condition is satisfied when the actual states of all SDK applications 152 corresponding to the product IDs match the state information (i.e., a logical AND operation is performed). Alternatively, the set condition may be satisfied when at least one of the actual states of the SDK applications 152 matches the state information (i.e., a logical OR operation may be performed). Also, each set condition may additionally include a parameter indicating a logical operation to be performed. In FIG. 9, the state information is indicated by one of the signs assigned to the respective states illustrated in FIGS. 6 and 7.

For example, a set condition A in FIG. 9 is satisfied if the actual states of the SDK applications 152 corresponding to product IDs "AAA", "BBB", "CCC", and "DDD" are the active state "a". As another example, a set condition B in FIG. 9 is satisfied if the actual states of the SDK applications 152 corresponding to product IDs "AAA" and "EEE" are the active state "a".

In FIG. 9, the check flags of the set conditions A and B are both set to "on". Meanwhile, in FIG. 10, the check flags of the set conditions A and B are both set to "off".

Changing the values of check flags makes it possible to select set conditions to be examined according to the user preference. For example, it is possible to select set conditions that need to be satisfied to implement a service.

In step S104, based on the check flags, the set condition management unit 162 determines whether there are set conditions that need to be examined. More specifically, the set condition management unit 162 determines whether there are set conditions whose check flags are set to "on".

When set conditions whose check flags are set to "on" are found, the set condition management unit 162 obtains the found set conditions from the set condition storing unit 165 (S105). Next, the set condition management unit 162 generates an inquiry list including the product IDs contained in the obtained set conditions (S106). In this step, the set condition management unit 162 eliminates duplicate product IDs in the set conditions.

FIG. 11 is a table illustrating an exemplary inquiry list. The inquiry list of FIG. 11 is generated based on the set conditions A and B illustrated in FIG. 9. Thus, an inquiry list contains a list of product IDs of the SDK applications 152 whose states are to be inquired about to determine whether selected set conditions are satisfied.

Next, the set condition management unit 162 sends the generated inquiry list to the set condition examination unit 163 (S107). Based on the inquiry list, the set condition examination unit 163 requests the application state obtaining unit 164 to generate an inquiry result list indicating the states of the SDK applications 152 included in the inquiry list (S108).

In response, the application state obtaining unit 164 requests the application management unit 184 to send a list of the SDK applications 152 installed in the image forming apparatus 10 (S109). The application management unit 184 obtains a list of product IDs of the installed SDK applications 152 from, for example, the NVRAM 115 and sends the obtained list of product IDs (hereafter called an installed application list) to the application state obtaining unit 164 (S110).

FIG. 12 is a table illustrating an exemplary installed application list. The installed application list of FIG. 12 includes, for each of installed SDK applications 152, the product ID and information indicating whether the corresponding SDK application 152 is in the started state or the stopped state. The application management unit 184 is configured to start and stop the SDK applications 152 and therefore knows whether each of the SDK applications 152 is in the started state or the stopped state. Alternatively, the installed application list may not include the information indicating whether the SDK applications 152 are in the started state or the stopped state.

Based on the installed application list, the application state obtaining unit 164 obtains the state of each of the SDK applications 152 included in the inquiry list. More specifically, for each of the SDK applications 152 that are in the started state and included in the inquiry list, the application state obtaining unit 164 requests the application state reporting unit 171 of the corresponding SDK application 152 to send the state information of the SDK application 152 (S111). In response to the request (or inquiry), the application state reporting unit 171 sends state information indicating the state of the corresponding SDK application 152 to the application state obtaining unit 164 (S112). Also, for each of the SDK applications 152 that are in the stopped state and included in the inquiry list, the application state obtaining unit 164 obtains state information from the application state storing unit 173 of the corresponding SDK application 152 (S113, S114). Meanwhile, the application state obtaining unit 164 does not send requests for state information to the SDK applications 152 that are included in the inquiry list but not installed in the image forming apparatus 10 (i.e., not included in the installed application list). Instead, the application state obtaining unit 164 determines that the SDK applications 152 are in the non-installed state "i".

After obtaining the state information of all the SDK applications 152 in the inquiry list, the application state obtaining unit 164 generates an inquiry result list based on the obtained state information (S115).

FIG. 13 is a table illustrating an exemplary inquiry result list. As illustrated in FIG. 13, the inquiry result list includes a combination of a product ID and state information for each of the SDK applications 152 in the inquiry list illustrated in FIG. 11. In FIG. 13, the state information is indicated by the signs assigned to the respective states illustrated in FIGS. 6 and 7.

Next, the application state obtaining unit 164 sends the generated inquiry result list to the set condition examination unit 163 (S116). The set condition examination unit 163 compares the set conditions whose check flags are "on" with the inquiry result list to determine whether the set conditions are satisfied (S117).

Take, for example, the set conditions A and B illustrated in FIG. 9. According to the inquiry result list of FIG. 13, the set condition A is not satisfied. That is, the states of the SDK applications 152 corresponding to the product IDs "BBB", "CCC", and "DDD" in the inquiry result list do not match the active state "a" specified in the set condition A. Meanwhile, the set condition B is satisfied. That is, the states of the SDK applications 152 corresponding to the product IDs "AAA" and "EEE" in the inquiry result list match the active state "a" specified in the set condition B.

Next, for each of the set conditions examined, the set condition examination unit 163 sends an examination result indicating whether the set condition is satisfied to the communication control unit 161 (S118). The examination result may also include detailed information. For example, the examination result may include the states of the SDK applications 152 that do not match the state information specified in the set condition. As another example, the examination result may include information indicating whether the state of each of the SDK applications 152 included in the set condition matches the corresponding state information specified in the set condition.

Next, the communication control unit 161 sends the examination results as a response to the examination request (S119). When receiving the examination results, the apparatus management server 20, for example, requests the user terminal 30 to display a screen including the examination results. The screen may be implemented, for example, by a Web page. Alternatively, the apparatus management server 20 may be configured to send an email message including the examination results to the user terminal 30.

The user refers to the examination results displayed on the user terminal 30 to confirm whether the set conditions are satisfied.

In the example of FIG. 8, the process performed by the application state management unit 152a is started in response to the examination request from the apparatus management server 20. Alternatively, the process performed by the application state management unit 152a may be started in response to an event other than the reception of the examination request from the apparatus management server 20. For example, the process may be started when the image forming apparatus 10 is started or may be started at a predetermined interval. In this case, the examination results may be "pushed" from the application state management unit 152a to the apparatus management server 20 and transferred from the apparatus management server 20 to the user terminal 30. This configuration enables the user to monitor the constantly-changing status of the set conditions in real time.

The process performed by the application state management unit 152a in FIG. 8 is described in more detail with reference to a flowchart of FIG. 14.

Figure 14:
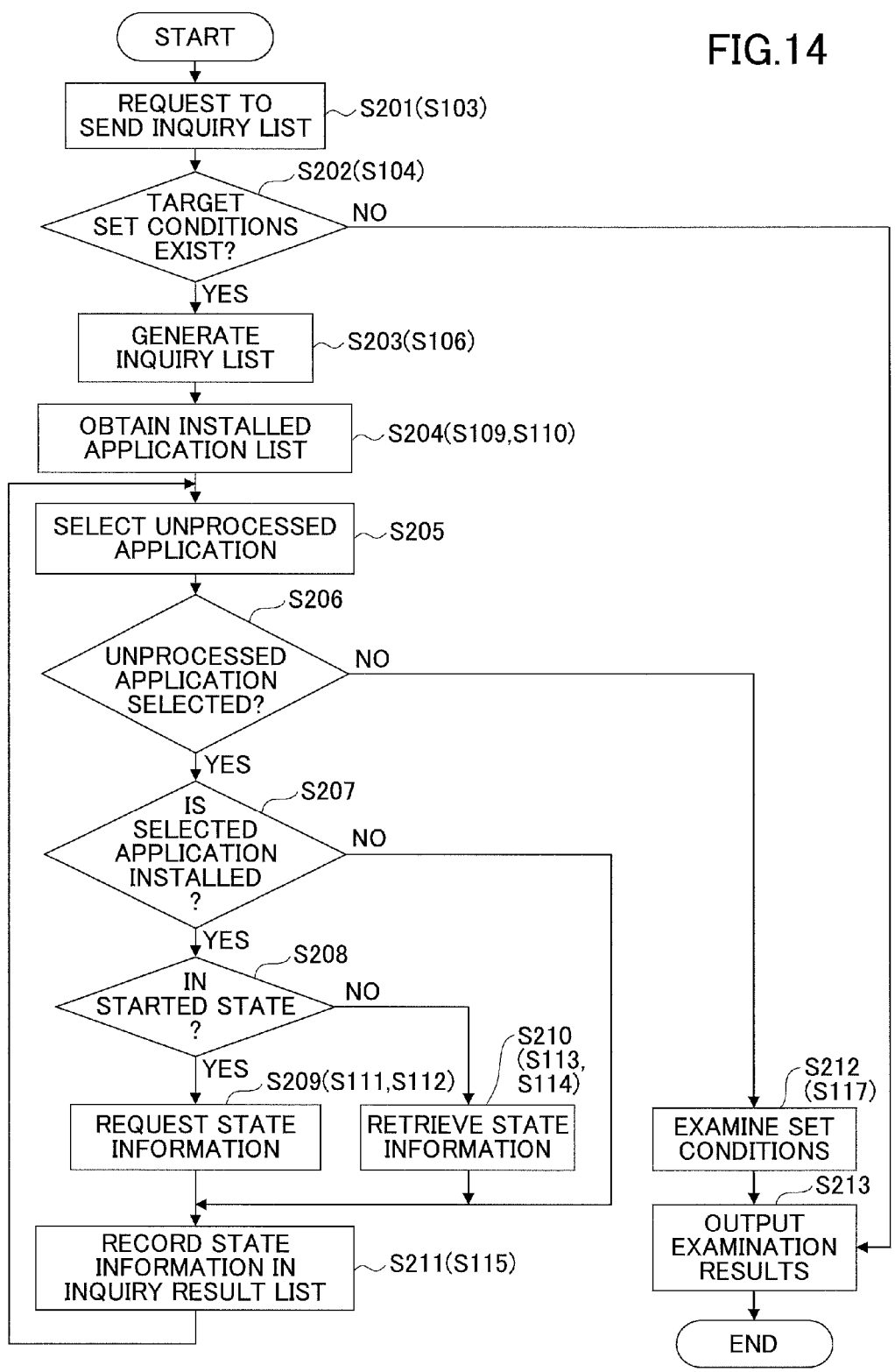
FIG. 14 is a flowchart illustrating an exemplary process performed by an application state management unit.

In FIG. 14, step numbers enclosed in brackets indicate the corresponding step numbers in FIG. 8.

In step S201, the set condition examination unit 163 requests the set condition management unit 162 to send an inquiry list. In response, based on the check flags of the set conditions stored in the set condition storing unit 165, the set condition management unit 162 determines whether there are "target" set conditions that need to be examined (S202).

When set conditions whose check flags are set to "on" are found (YES in S202), the set condition management unit 162 generates an inquiry list including a list of the product IDs in the found set conditions (S203). Next, the application state obtaining unit 164 obtains an installed application list from the application management unit 184 (S204).

Then, the application state obtaining unit 164 selects one of the "unprocessed" product IDs from the inquiry list (S205). Here, "unprocessed" indicates that step S206 and subsequent steps have not been performed for the product IDs. When an unprocessed product ID is selected (or present in the inquiry list) (YES in S206), the application state obtaining unit 164 determines whether the SDK application 152 (hereafter called a current application) corresponding to the product ID has been installed (S207). More specifically, the application state obtaining unit 164 determines whether the product ID of the current application is in the installed application list.

If the product ID is in the installed application list (YES in S207), the application state obtaining unit 164 determines whether the current application is in the started state (S208). For example, when the installed application list includes information indicating whether the SDK applications 152 are in the started state as illustrated in FIG. 12, the application state obtaining unit 164 may be configured to determine whether the current application is in the started state by referring to the installed application list. Alternatively, the application state obtaining unit 164 may be configured to try to obtain state information from the current application and to determine that the current application is in the started state if the state information is successfully obtained.

If the current application is in the started state (YES in S208), the application state obtaining unit 164 requests the application state reporting unit 171 of the current application to send the state information of the current application (S209). Here, if the installed application list indicates that the current application is in the started state but the application state reporting unit 171 of the current application does not respond to the request for the state information, the application state obtaining unit 164 determines that the current application is in the error state "d". Alternatively, the application state obtaining unit 164 may be configured to repeat the request for the state information at a predetermined interval and to determine that the current application is in the error state "d" if the number of repetitions exceeds a predetermined value (an upper limit) or a predetermined period of time passes.

If the current application is not in the started state (NO in S208), the application state obtaining unit 164 obtains (or retrieves) the state information from the application state storing unit 173 of the current application (S210). Thus, storing the state information in the application state storing unit 173 (i.e., a storage area associated with the SDK application 152) makes it possible to obtain the state information of an SDK application 152 that has not been started.

Next, the application state obtaining unit 164 records (or adds) the product ID and the state information of the current application in an inquiry result list (S211). Meanwhile, if it is determined that the current application has not been installed (NO in S207), the non-installed state "i" is recorded as the state information of the current application.

When steps S205 through S211 have been performed for all of the SDK applications 152 in the inquiry list (NO in S206), the set condition examination unit 163 compares the set conditions whose check flags are "on" with the inquiry result list, thereby determines whether the set conditions are satisfied, and generates examination results (S212). Meanwhile, if there is no set condition whose check flag is "on" (NO in S202), an examination result indicating that there is no set condition to be examined is generated. Then, the communication control unit 161 outputs or sends the examination results of the set condition examination unit 163 (S213).

A set condition may be defined in any appropriate manner. FIG. 15 illustrates another exemplary set condition C used to confirm that incompatible SDK applications do not coexist. Here, "coexist" means that the SDK applications are installed in the same image forming apparatus 10.

The set condition C is satisfied if the SDK applications 152 corresponding to the product IDs "AAA", "BBB", and "CCC" (hereafter called the first SDK applications 152) are in the active state "a" and the SDK application 152 corresponding to the product ID "DDD" (hereafter called the second SDK application 152) is in the non-installed state "i". Thus, the set condition C is used to determine whether the first SDK applications 152 and the second SDK application 152 coexist. When the set condition C is satisfied, the first SDK applications 152 and the second SDK application 152 do not coexist. Meanwhile, when the set condition C is not satisfied, the first SDK applications 152 and the second SDK application 152 may coexist. However, even if the second SDK application 152 is in the non-installed state "i", the set condition C is not satisfied if the states of the first SDK applications 152 do not match the specified states. To obviate this problem, multiple states (conditions or parameters) may be specified for each of the first SDK applications 152. For example, in the set condition C, all states other than the non-installed state "i" may be specified for each of the first SDK applications 152. In this case, the set condition C is satisfied if the second SDK application 152 is in the non-installed state and each of the first SDK applications 152 is in any one of the specified states.

Also, as illustrated in FIGS. 6 and 7, the states of the SDK applications 152 have an inclusion relationship or a hierarchical structure. For example, the installed state includes the started state and the stopped state, and each of the started state and the stopped state includes multiple states. It is possible to specify states at a given hierarchical level in a set condition. For example, in the set condition C, the installed state may be specified for each of the first SDK applications 152. In this case, the set condition C is satisfied if each of the first SDK applications 152 is in any one of the states included in the installed state and the second SDK application 152 is in the non-installed state "i".

Set conditions are independent of each other. Therefore, set conditions that are mutually exclusive may be defined and examined at the same time.

FIG. 16 is a table illustrating exemplary set conditions that are mutually exclusive. As illustrated in FIG. 16, a set condition D requires that the SDK application 152 corresponding to a product ID "BBB" is in the active state "a". Meanwhile, a set condition E requires that the SDK application 152 corresponding to the product ID "BBB" is in the standby state "e". Here, the active state "a" and the standby state "e" are mutually exclusive. Accordingly, there is no possibility that the set conditions D and E are satisfied at the same time. However, such mutually-exclusive set conditions may be examined at the same time. This, for example, allows the user to check which one of the mutually-exclusive set conditions is satisfied.

Also, a set condition is not necessarily used to confirm an affirmative (or desired) condition. For example, it is possible to define a set condition indicating a negative (or undesirable) condition and determine whether the set condition is satisfied to confirm the occurrence of the undesirable condition.

As described above, according to the first embodiment, set conditions are registered in the set condition storing unit 165 and the actual states of the SDK applications are compared with the states of the SDK applications specified in the set conditions to determine whether the set conditions are satisfied. Registering a combination (or set) of states of the SDK applications 152 as a set condition in the set condition storing unit 165 in advance makes it possible to easily determine whether the combination of the states of the SDK applications 152 is met.

For example, to confirm whether a service implemented by collaboration of multiple SDK applications 152 is available, a set condition that is satisfied when all the SDK applications 152 are in the active state "a" may be registered.

However, set conditions may be used not only to determine the availability of services, but also to confirm any conditions specified by the user.

An exemplary functional configuration of the apparatus management server 20 and an exemplary process of registering set conditions in the image forming apparatus 10 according to a second embodiment are described below. Here, differences between the first embodiment and the second embodiment are mainly described and descriptions in the first embodiment may also apply to the second embodiment unless otherwise mentioned.

Figure 17:
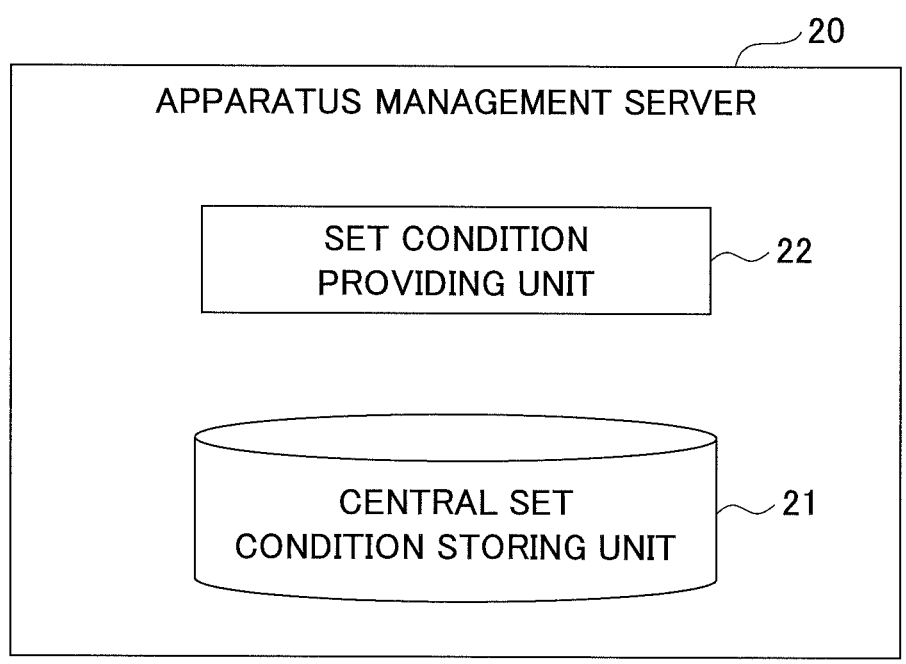
FIG. 17 is a drawing illustrating an exemplary functional configuration of an apparatus management server according to a second embodiment.

FIG. 17 is a drawing illustrating an exemplary functional configuration of the apparatus management server 20 according to the second embodiment. As illustrated in FIG. 17, the apparatus management server 20 includes a central set condition storing unit 21 and a set condition providing unit 22. These functional units may be implemented by executing programs installed in the apparatus management server 20 by the CPU 204.

The central set condition storing unit 21 concentrates and stores set conditions to be registered in multiple image forming apparatuses 10 using the secondary storage unit 202 of the apparatus management server 20. The configuration of set conditions stored in the central set condition storing unit 21 may be substantially the same as the configuration of set conditions stored in the set condition storing unit 165 of the image forming apparatus 10 (see FIG. 9). However, while the set condition storing unit 165 stores only set conditions related to the corresponding image forming apparatus 10, the central set condition storing unit 21 stores set conditions related to multiple image forming apparatuses 10.

The set condition providing unit 22 provides the set conditions stored in the central set condition storing unit 21 to the image forming apparatuses 10. More specifically, the set condition providing unit 22 provides only set conditions to each image forming apparatus 10 that are valid for the image forming apparatus 10.

Figure 18:
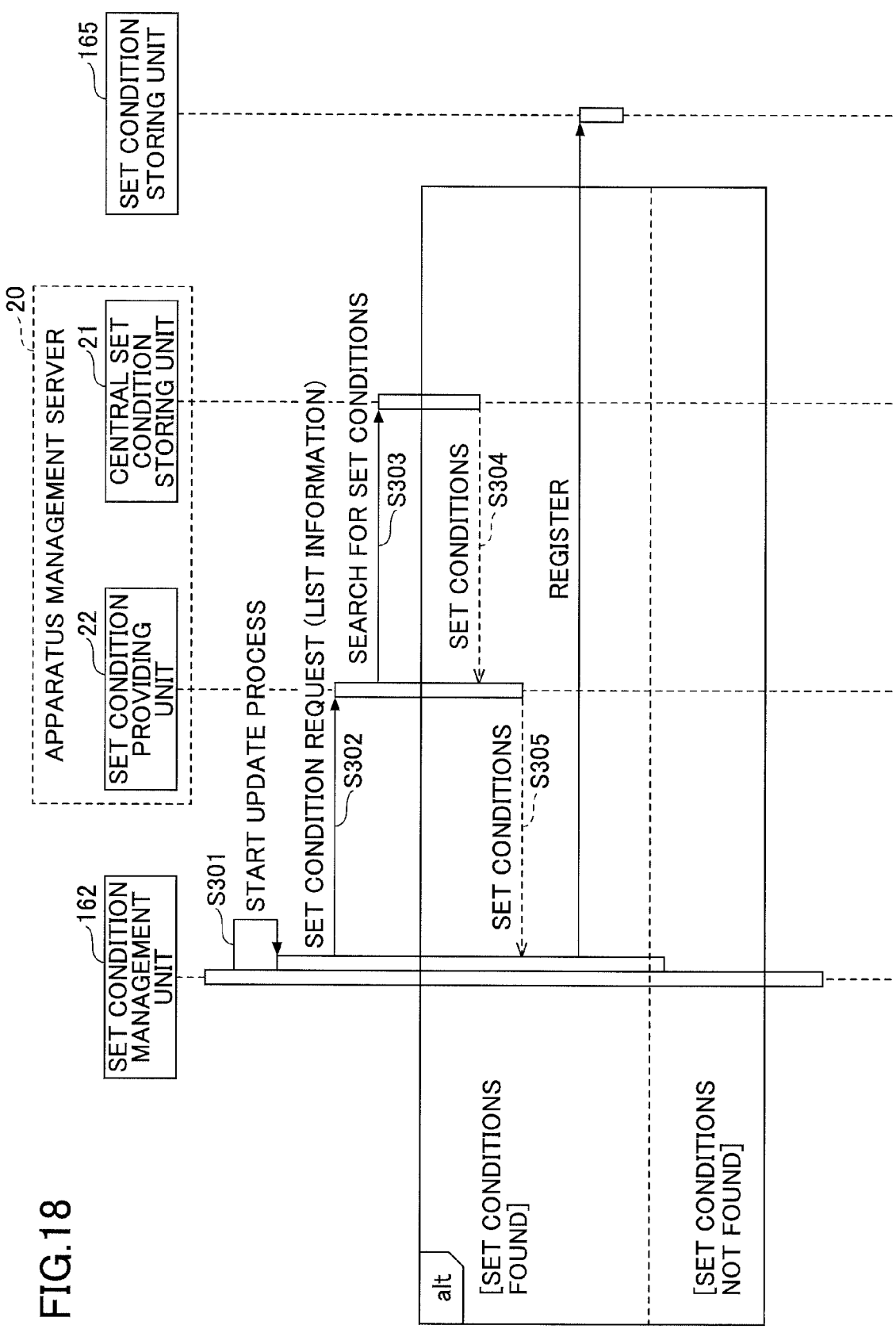
FIG. 18 is a sequence chart illustrating an exemplary process of registering set conditions in an image forming apparatus according to the second embodiment.

An exemplary process of registering set conditions in the image forming apparatus 10 is described below. FIG. 18 is a sequence chart illustrating an exemplary process of registering set conditions in the image forming apparatus 10 according to the second embodiment. In the second embodiment, the process of FIG. 10 may be performed even when no set condition is registered in the set condition storing unit 165 of the image forming apparatus 10.

At a predetermined timing, the set condition management unit 162 starts a process of updating the set condition storing unit 165 (S301). Step S301 may be performed, for example, immediately after the startup of the image forming apparatus 10 or at regular intervals. Alternatively, step S301 may be performed after the set condition examination unit 163 requests an inquiry list at step S103 in FIG. 8 and before step S104 in FIG. 8 is performed.

Then, the set condition management unit 162 sends a set condition request to the set condition providing unit 22 of the apparatus management server 20 (S302). The set condition request includes a list (list information) of the product IDs of the SDK applications 152 installed in the image forming apparatus 10. The set condition management unit 162 may obtain the list information from the application management unit 184.

In response to the set condition request, the set condition providing unit 22 searches for and retrieves set conditions to be provided to the requesting image forming apparatus 10 (that has sent the set condition request) from the central set condition storing unit 21 (S303). The set condition providing unit 22 retrieves only the set conditions that are valid for the requesting image forming apparatus 10. Here, "valid" set conditions indicate that the SDK applications 152 specified in the set conditions (i.e., the SDK applications 152 whose states are to be confirmed to determine whether the set conditions are satisfied) correspond to the product IDs in the set condition request. This is because if a set condition includes an SDK application 152 not installed in the requesting image forming apparatus 10, the set condition will never be satisfied in the requesting image forming apparatus 10 and is therefore invalid. However, even if a set condition includes an SDK application 152 that is not installed in the requesting image forming apparatus 10 that has sent the set condition request, the set condition may be provided to the requesting image forming apparatus 10 if the state information specified for the SDK application 152 is the non-installed state "i".

For example, when the set condition request includes product IDs "AAA" and "EEE" and the set conditions A and B of FIG. 9 are stored in the central set condition storing unit 21, the set condition B is provided to the requesting image forming apparatus 10 but the set condition A is not provided to the requesting image forming apparatus 10. As another example, when the set condition request includes product IDs "AAA", "BBB", and "CCC" and the set condition C of FIG. 15 is stored in the central set condition storing unit 21, the set condition C is provided to the requesting image forming apparatus 10. This is because, although the set condition C includes the SDK application 152 with a product ID "DDD" that is not included in the set condition request, the state information specified for the SDK application 152 with the product ID "DDD" is the non-installed state "i".

When one or more "valid" set conditions are found (S304), the set condition providing unit 22 sends the found set conditions to the set condition management unit 162 of the requesting image forming apparatus 10 (S305). Then, the set condition management unit 162 registers (or records) the set conditions sent from the apparatus management server 20 in the set condition storing unit 165 (S305). When a set condition with the same name as one of the set conditions sent from the apparatus management server 20 is already in the set condition storing unit 165, the set condition is overwritten (or updated).

Meanwhile, if no "valid" set condition is found (i.e., if no set condition is sent from the apparatus management server 20), no set condition is registered in the set condition storing unit 165.

As described above, according to the second embodiment, set conditions stored in the central set condition storing unit 21 of the apparatus management server 20 are automatically downloaded to each of the image forming apparatuses 10 and registered in the set condition storing unit 165. With this configuration, an administrator (or user) only needs to register set conditions in the central set condition storing unit 21 of the apparatus management server 20 and does not need to manually register set conditions in each of the image forming apparatuses 10. Also with the configuration of the second embodiment, only "valid" set conditions are downloaded according to the SDK applications 152 installed in the respective image forming apparatuses 10. This in turn makes it possible to prevent wasting the storage areas of the image forming apparatus 10 by registering unnecessary (or invalid) set conditions.

Next, a variation of second embodiment is described as a third embodiment. Here, differences between the second embodiment and the third embodiment are mainly described and descriptions in the second embodiment may also apply to the third embodiment unless otherwise mentioned.

Figure 19:
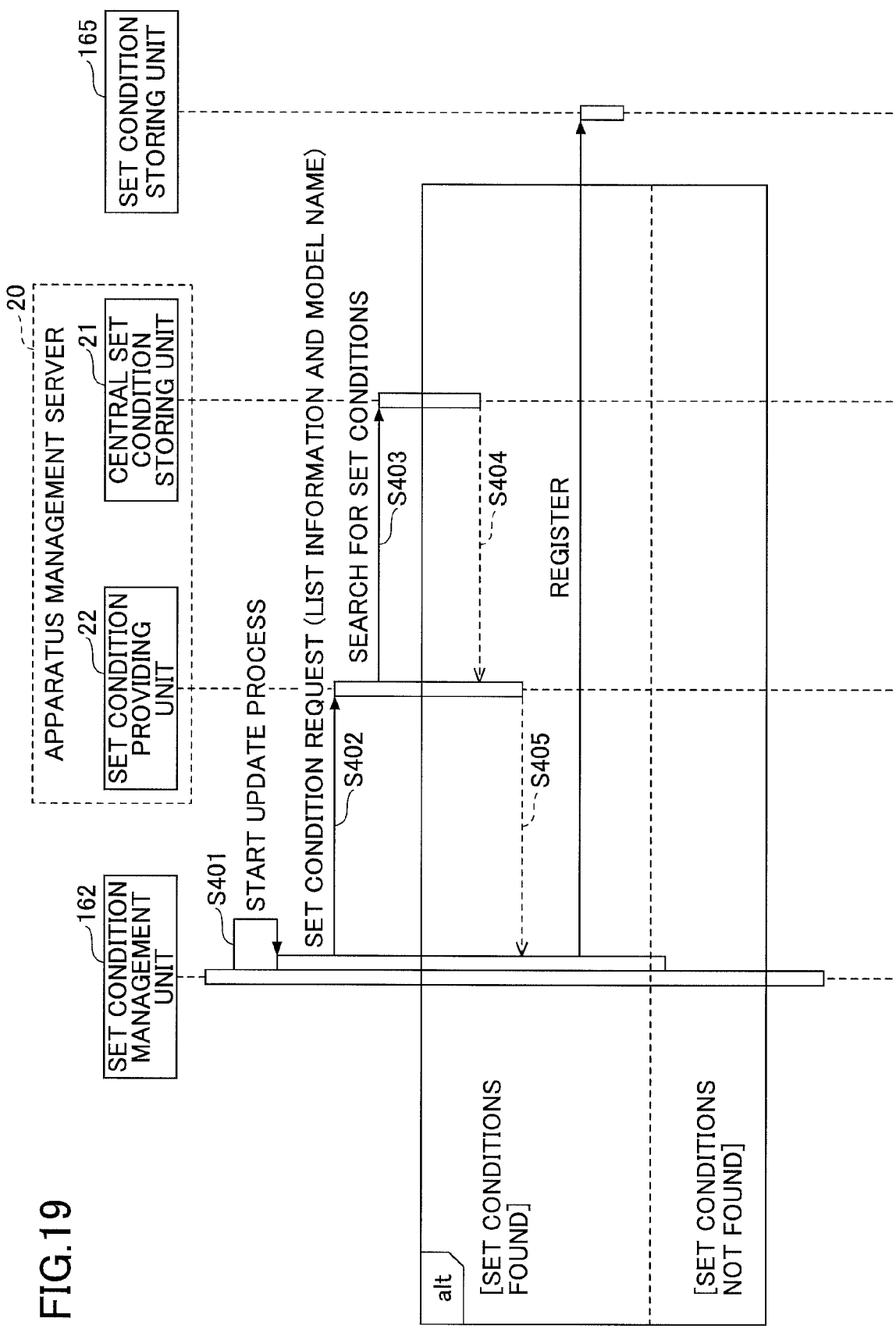
FIG. 19 is a sequence chart illustrating an exemplary process of registering set conditions in an image forming apparatus according to a third embodiment.

FIG. 19 is a sequence chart illustrating an exemplary process of registering set conditions in the image forming apparatus 10 according to the third embodiment.

Steps S402 and S403 of FIG. 19 are partly different from steps S302 and S303 of FIG. 18 as described below. Steps S401, S404, and S405 of FIG. 19 are substantially the same as steps S301, S304, and S305 of FIG. 18.

In step S402, the set condition management unit 162 sends a set condition request to the set condition providing unit 22 of the apparatus management server 20. In this embodiment, the set condition request includes the model name (model information) of the image forming apparatus 10 in addition to a list (list information) of the product IDs of the SDK applications 152 installed in the image forming apparatus 10.

In response to the set condition request, the set condition providing unit 22 searches for and retrieves set conditions to be provided to the requesting image forming apparatus 10 (that has sent the set condition request) from the central set condition storing unit 21 (S403).

FIG. 20 is a table illustrating an exemplary configuration of set conditions stored in the central set condition storing unit 21 according to the third embodiment. As illustrated in FIG. 20, set conditions are associated with model names of the image forming apparatuses 10 where the set conditions are valid.

The SDK applications 152 that can be installed in an image forming apparatus 10 may depend on its model. Although the APIs provided by the SDK platform 153 are machine-independent (or model-independent), an SDK application 152 that requires functions (e.g., special hardware) unique to a particular model does not work in a different model. In the third embodiment, to determine "valid" set conditions based on the dependence between the SDK applications 152 and the models of the image forming apparatuses 10, set conditions are associated with model names. Here, multiple set conditions may be associated with one model name. In the example of FIG. 20, set conditions F and H are associated with a model name "RRR5000". Also, one set condition may be associated with multiple model names.

In step S403, the set condition providing unit 22 selects set conditions from a group of set conditions that are associated with the model name specified in the set condition request. In other words, the set condition providing unit 22 selects set conditions based on the model name and the list of the product IDs.

Step S404 and subsequent steps are substantially the same as step S304 and subsequent steps of FIG. 18.

The third embodiment provides advantageous effects similar to those provided by the second embodiment. Also, since the set conditions are associated with model names of the image forming apparatuses 10, it is possible to exclude set conditions, which might be selected with the process of the second embodiment, based on the model names. Thus, the third embodiment makes it possible to more accurately select set conditions that are valid for the respective image forming apparatuses 10.

Next, another variation of the second embodiment is described as a fourth embodiment. Here, differences between the second embodiment and the fourth embodiment are mainly described and descriptions in the second embodiment may also apply to the fourth embodiment unless otherwise mentioned.

Figure 21:
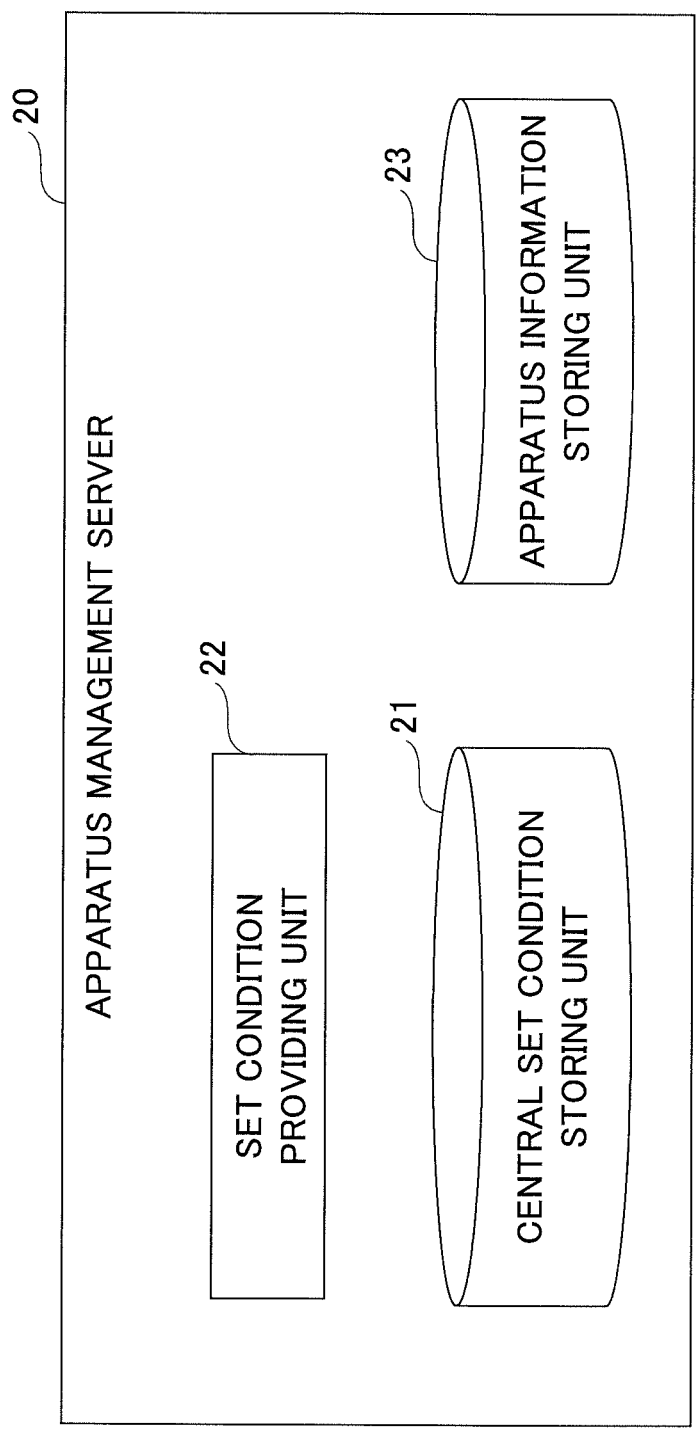
FIG. 21 is a drawing illustrating an exemplary functional configuration of an apparatus management server according to a fourth embodiment.

FIG. 21 is a drawing illustrating an exemplary functional configuration of the apparatus management server 20 according to the fourth embodiment. The same reference numbers as in FIG. 17 are assigned to the corresponding components in FIG. 21 and descriptions of those components are omitted here. In FIG. 21, the apparatus management server 20 further includes an apparatus information storing unit 23. The apparatus information storing unit 23 stores lists of the SDK applications 152 installed in the respective image forming apparatuses 10 using the secondary storage unit 202 of the apparatus management server 20.

Figure 22:
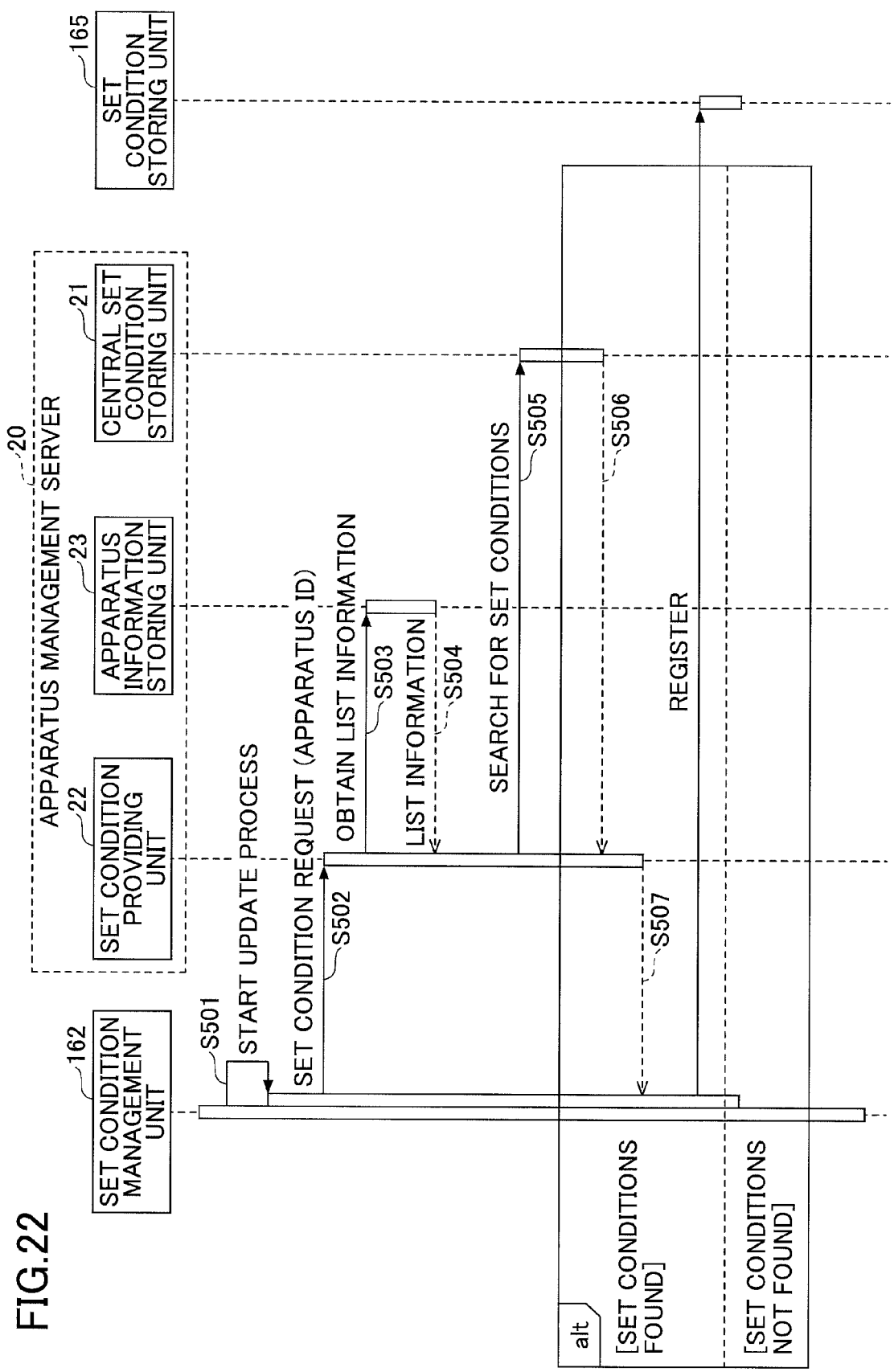
FIG. 22 is a sequence chart illustrating an exemplary process of registering set conditions in an image forming apparatus according to the fourth embodiment.

FIG. 22 is a sequence chart illustrating an exemplary process of registering set conditions in the image forming apparatus 10 according to the fourth embodiment.

Step S501 of FIG. 22 is substantially the same as step S301 of FIG. 18. After step S501, the set condition management unit 162 sends a set condition request to the set condition providing unit 22 of the apparatus management server 20 (S502). In this embodiment, the set condition request includes identification information (an apparatus ID that is unique to each image forming apparatus 10) of the requesting image forming apparatus 10.

Based on the apparatus ID specified in the set condition request, the set condition providing unit 22 obtains the list of the SDK applications 152 installed in the requesting image forming apparatus 10 from the apparatus information storing unit 23 (S503, S504).

FIG. 23 is a table illustrating an exemplary configuration of information stored in the apparatus information storing unit 23. As illustrated in FIG. 23, the apparatus information storing unit 23 stores, for each image forming apparatus 10, the apparatus ID and the product IDs of the SDK applications 152 installed in the image forming apparatus 10. The apparatus management server 20 may be configured to regularly request each of the image forming apparatuses 10 to send a list of the product IDs of the installed SDK applications 152 and to register the obtained list of the product IDs in the apparatus information storing unit 23.

Thus, in step S504, the set condition providing unit 22 obtains the list of the product IDs of the SDK applications 152 installed in the requesting image forming apparatus 10.

Step S505 and subsequent steps are substantially the same as step S303 and subsequent steps of FIG. 18, except that the set condition providing unit 22 retrieves set conditions based on the list of the product IDs obtained from the apparatus information storing unit 23 in step S504.

The fourth embodiment provides advantageous effects similar to those provided by the second embodiment. Also, the fourth embodiment eliminates the need to include a list of product IDs in the set condition request to be sent from the image forming apparatus 10 to the apparatus management server 20 and thereby makes it possible to reduce the communication load.

The process of FIG. 22 may also be performed when SDK applications 152 are (additionally) installed in the image forming apparatus 10 and/or when (some) SDK applications 152 are uninstalled from the image forming apparatus 10. In this case, the set condition request sent in step S502 may include the product IDs of installed or uninstalled SDK applications 152 in addition to the apparatus ID. When the set condition request includes the apparatus ID and the product IDs of installed SDK applications, the set condition providing unit 22 stores the product IDs in the apparatus information storing unit 23 in association with the apparatus ID. Meanwhile, when the set condition request includes the apparatus ID and the product IDs of uninstalled SDK applications, the set condition providing unit 22 removes the product IDs associated with the apparatus ID from the apparatus information storing unit 23. Then, the set condition providing unit 22 performs step S503 and subsequent steps.

The above process makes it possible to efficiently report changes in the SDK applications 152 installed in the image forming apparatus 10 to the apparatus management server 20. In other words, the above process makes it possible to synchronize the information stored in the apparatus information storing unit 23 of the apparatus management server 20 with the configurations of the SDK applications 152 currently installed in the image forming apparatuses 10. This in turn makes it possible to register set conditions corresponding to the currently-installed SDK applications 152 in the image forming apparatuses 10.

The third embodiment and the fourth embodiment may be combined together. That is, also in the fourth embodiment, set conditions stored in the central set condition storing unit 21 may have the configuration as illustrated in FIG. 20. In this case, the set condition request may include a model name in addition to an apparatus ID, and step S505 and subsequent steps may be performed in a manner similar to step S403 and subsequent steps of FIG. 19.

In the second through fourth embodiments, set conditions that are valid for the requesting image forming apparatus 10 are searched for (i.e., selected) by the apparatus management server 20. Alternatively, the image forming apparatus 10 may be configured to select "valid" set conditions by itself. In this case, the apparatus management server 20 may be configured to transfer all set conditions stored in the central set condition storing unit 21 to the image forming apparatus 10. The set condition management unit 162 of the image forming apparatus 10 may be configured to select "valid" set conditions from the set conditions received from the apparatus management server 20 through steps similar to those performed by the set condition providing unit 22 of the apparatus management server 20 in the second through fourth embodiments and to store the selected set conditions in the set condition storing unit 165.

Also in the above embodiments, the application state management unit 152a is implemented as an SDK application. This configuration makes it possible to install the application state management unit 152a as an SDK application in the image forming apparatus 10 and is therefore particularly suitable to apply the present invention to image forming apparatuses that are already on the market.

However, employing this configuration is not based on technical limitations. For example, the application state management unit 152a may be implemented in the SDK platform 153.

Figure 24:
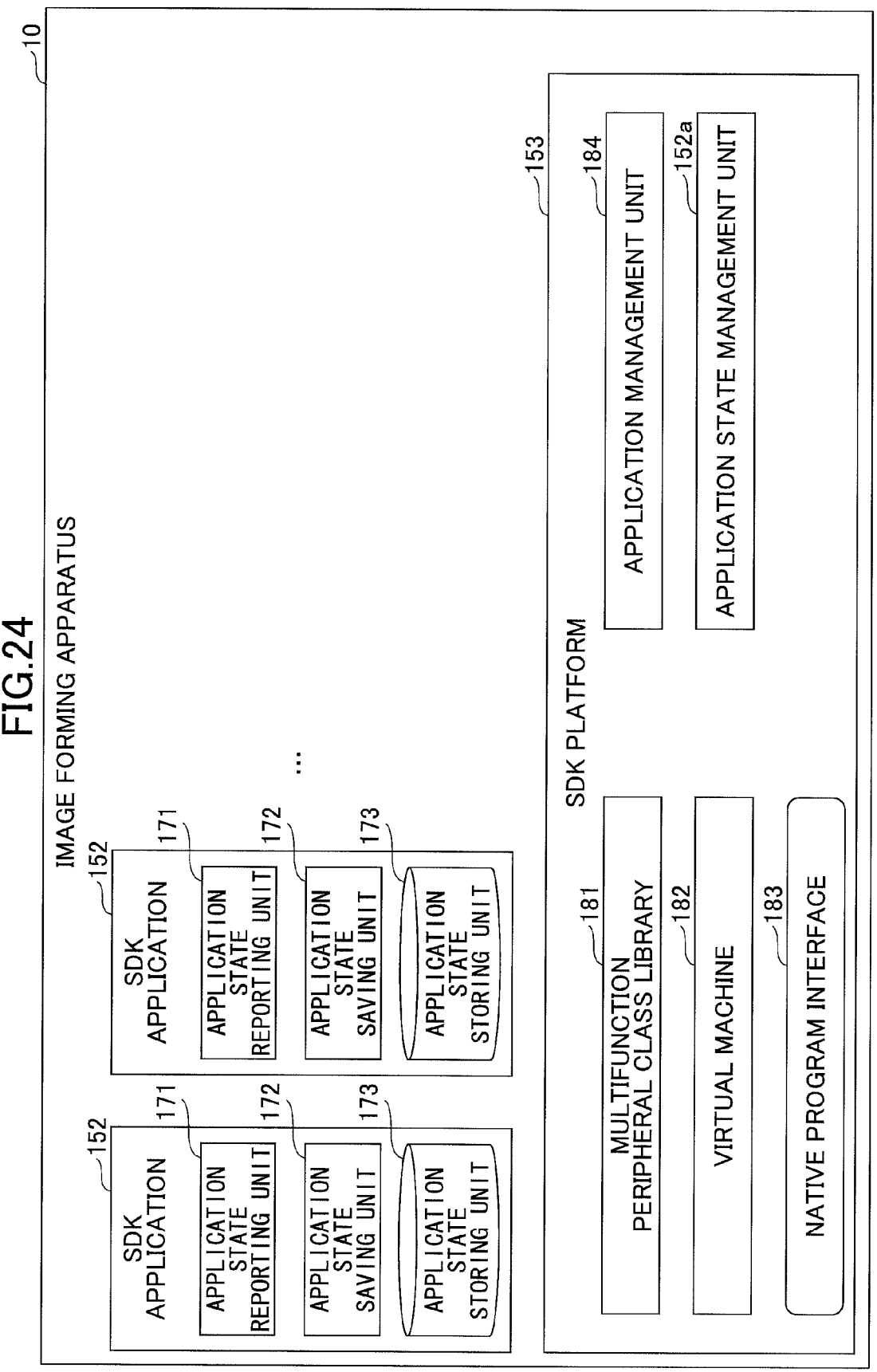
FIG. 24 is a drawing illustrating an exemplary functional configuration of an SDK platform including an application state management unit.

FIG. 24 is a drawing illustrating an exemplary functional configuration of the SDK platform 153 including the application state management unit 152a. The same reference numbers as in FIG. 5 are assigned to the corresponding components in FIG. 24 and descriptions of those components are omitted here.

In FIG. 24, the application state management unit 152a is included in the SDK platform 153. This configuration eliminates the need to install the application state management unit 152a as an SDK application 152. Meanwhile, with this configuration, it is necessary to upgrade the SDK platform 153 to add the function of the application state management unit 152a to an image forming apparatus on the market.

As described above, an aspect of this disclosure provides an image forming apparatus, a program state determination system, and a non-transitory computer-readable storage medium storing program code for causing a computer to perform a program state determination method that make is possible to easily determine the states multiple programs.

The present invention is not limited to the specifically disclosed embodiments, and variations and modifications may be made without departing from the scope of the present invention.

What is claimed is:

1. An image forming apparatus, comprising:
a memory that stores programs installed in the image forming apparatus, each of the programs having plural states; and
a platform including a management unit that manages the programs,
wherein one of the programs that is managed includes
a condition storing unit that stores at least one condition defining a set of states of one or more of the other programs;
a state obtaining unit that obtains state information indicating current states of the other programs; and
a condition examination unit that examines the condition based on the obtained state information to determine whether the condition is satisfied and to output a result of the determination.

2. The image forming apparatus as claimed in claim 1, wherein
the condition stored in the condition storing unit includes information indicating whether the condition is a target condition to be examined; and
the condition examination unit examines the condition only when the condition is the target condition.

3. The image forming apparatus as claimed in claim 1, wherein the state obtaining unit obtains the state information from the other programs.

4. The image forming apparatus as claimed in claim 3, wherein when the other programs are inactive, the state obtaining unit obtains the state information from storage areas associated with the other programs.

5. The image forming apparatus as claimed in claim 1, wherein plural states can be specified for each of the other programs specified in the condition.

6. The image forming apparatus as claimed in claim 1, wherein
the condition storing unit stores at least one condition defining a set of started states of two or more of the other programs, a provided function is implemented by the two or more of the other programs, and
the condition examination unit that examines the condition based on the obtained state information determines that the condition is satisfied when the state information of the two or more of the other programs are started states.

7. A non-transitory computer-readable storage medium storing program code for causing an image forming apparatus to perform a method comprising:
managing programs via a management unit included in a platform installed in the image forming apparatus;
obtaining state information, via one of the programs, indicating current states of the other programs installed in the image forming apparatus, each of the programs having plural states;
examining a condition, which is stored in a condition storing unit of the one program installed in the image forming apparatus and defines a set of states of one or more of the other programs, based on the obtained state information to determine whether the condition is satisfied; and
outputting a result of the determination.

8. The non-transitory computer-readable storage medium as claimed in claim 7, wherein
the condition storing unit stores at least one condition defining a set of started states of two or more of the other programs, a provided function is implemented by the two or more of the other programs, and
the examining the condition based on the obtained state information includes determining that the condition is satisfied when the state information of the two or more of the other programs are started states.

9. A system comprising:
an image forming apparatus where programs are installed, each of the programs having plural states; and
an information processing apparatus that communicates with the image forming apparatus via a network, wherein
the information processing apparatus includes
a central condition storing unit that stores one or more conditions each defining a set of states of one or more of the programs, and
a condition providing unit that sends the conditions stored in the central condition storing unit to the image forming apparatus;
the image forming apparatus includes
a condition storing unit,
a condition management unit that receives the conditions sent from the condition providing unit and registers the received conditions in the condition storing unit,
a state obtaining unit that obtains state information indicating current states of the programs installed in the image forming apparatus, and
a condition examination unit that examines the conditions based on the obtained state information to determine whether the conditions are satisfied and to output results of the determination.

10. The system as claimed in claim 9, wherein
the condition management unit sends list information indicating a list of the programs installed in the image forming apparatus to the information processing apparatus; and
the condition providing unit selects the conditions to be sent to the image forming apparatus based on the list information.

11. The system as claimed in claim 10, wherein
the central condition storing unit stores the conditions in association with model information of the image forming apparatus;
the condition management unit sends the list information and the model information of the image forming apparatus to the information processing apparatus; and
the condition providing unit selects the conditions to be sent to the image forming apparatus based on the list information and the model information.

12. The system as claimed in claim 9, wherein
the information processing apparatus further includes an apparatus information storing unit that stores list information indicating a list of the programs installed in the image forming apparatus in association with identification information of the image forming apparatus;
the condition management unit sends the identification information of the image forming apparatus to the information processing apparatus; and
the condition providing unit selects the conditions to be sent to the image forming apparatus based on the list information stored in the apparatus information storing unit in association with the identification information.

13. The system as claimed in claim 12, wherein
when an additional program is installed into the image forming apparatus, the condition management unit sends the identification information of the image forming apparatus and identification information of the additional program to the information processing apparatus; and the condition providing unit adds the identification information of the additional program to the list information stored in the apparatus information storing unit in association with the identification information of the image forming apparatus.

14. The system as claimed in claim 12, wherein
when one of the programs is uninstalled from the image forming apparatus, the condition management unit sends the identification information of the image forming apparatus and identification information of the uninstalled program to the information processing apparatus; and
the condition providing unit removes the identification information of the uninstalled program from the list information stored in the apparatus information storing unit in association with the identification information of the image forming apparatus.

15. The system as claimed in claim 9, wherein
the condition storing unit stores at least one condition defining a set of started states of two or more of the programs, a provided function is implemented by the two or more of the programs, and
the condition examination unit that examines the conditions based on the obtained state information determines that the at least one condition is satisfied when the state information of the two or more of the other programs are started states.

\* \* \* \* \*

UNITED STATES PATENT AND TRADEMARK OFFICE
CERTIFICATE OF CORRECTION

PATENT NO. : 8,839,250 B2
APPLICATION NO. : 13/207007
DATED : September 16, 2014
INVENTOR(S) : Saki Wataishi It is certified that error appears in the above-identified patent and that said Letters Patent is hereby corrected as shown below:

On the Title Page, Item (54) and in the Specification, Col. 1:

Correct Title of Invention from

IMAGE FORMING APPARATUS, STORAGE MEDIUM, AND PROGRAM SYSTEM DETERMINATION to

IMAGE FORMING APPARATUS, STORAGE MEDIUM, AND PROGRAM STATE DETERMINATION SYSTEM

Signed and Sealed this
Seventeenth Day of February, 2015

Michelle K. Lee
*Deputy Director of the United States Patent and Trademark Office*